(12) United States Patent
Zhu et al.

(10) Patent No.: US 10,649,761 B2
(45) Date of Patent: *May 12, 2020

(54) APPLICATION UPGRADE METHOD AND APPARATUS

(71) Applicant: HUAWEI TECHNOLOGIES CO.,LTD., Shenzhen, Guangdong (CN)

(72) Inventors: Jie Zhu, Shenzhen (CN); Chuxiong Zhang, Shenzhen (CN); Yi Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/220,962

(22) Filed: Dec. 14, 2018

(65) Prior Publication Data

US 2019/0129709 A1 May 2, 2019

Related U.S. Application Data

(63) Continuation of application No. 15/618,851, filed on Jun. 9, 2017, now Pat. No. 10,191,730, which is a
(Continued)

(51) Int. Cl.
*G06F 9/44* (2018.01)
*G06F 8/65* (2018.01)
*H04L 29/08* (2006.01)

(52) U.S. Cl.
CPC .............. *G06F 8/65* (2013.01); *H04L 67/10* (2013.01)

(58) Field of Classification Search
CPC ............................. G06F 8/60–71; H04L 67/10
(Continued)

(56) References Cited

U.S. PATENT DOCUMENTS 6,199,204 B1  3/2001  Donohue
6,912,711 B1  6/2005  Curtis et al.
(Continued)

FOREIGN PATENT DOCUMENTS

CN  102413022 A  4/2012
CN  102495733 A  6/2012
(Continued)

OTHER PUBLICATIONS

"Package Manager," Wikipedia entry, Aug. 5, 2013, XP55355638, total 6 pages.
(Continued)

*Primary Examiner* — Francisco J Aponte
(74) *Attorney, Agent, or Firm* — Gregg L. Jansen

(57) ABSTRACT

Embodiments of the present invention provide an application upgrade method and an apparatus. The application upgrade method includes: receiving an application deployment request; determining a deployment package of a to-be-deployed application; determining that a version of a first platform node is below a version requirement of a node template of the to-be-deployment application for a first platform node template; acquiring a first platform node upgrade package that meets the version requirement of the node template of the to-be-deployed application for the first platform node template; upgrading the first platform node indicated by an identifier of the first platform node by using the first platform node upgrade package; determining an identifier of a to-be-upgraded application node; and upgrading the application node indicated by the identifier of the to-be-upgraded application node by using the deployment package of the to-be-deployed application.

20 Claims, 9 Drawing Sheets

Related U.S. Application Data continuation of application No. 14/820,977, filed on Aug. 7, 2015, now Pat. No. 9,696,984, which is a continuation of application No. PCT/CN2013/081410, filed on Aug. 13, 2013.

(58) Field of Classification Search
USPC .................................................. 717/168–178
See application file for complete search history.

(56) References Cited

U.S. PATENT DOCUMENTS

| | | | |
|---|---|---|---|
| 7,634,488 | B2 | 12/2009 | Keys et al. |
| 7,874,008 | B2 | 1/2011 | Chang et al. |
| 8,407,689 | B2 | 3/2013 | Dournov et al. |
| 8,627,310 | B2 | 1/2014 | Ashok et al. |
| 8,997,078 | B2 * | 3/2015 | Spivak .................. G06F 9/5055 717/168 |
| 8,997,088 | B2 * | 3/2015 | Gurikar .................. G06F 8/61 717/168 |
| 9,043,778 | B2 | 5/2015 | Lin et al. |
| 9,047,133 | B2 * | 6/2015 | Winterfeldt .............. G06F 8/60 |
| 9,189,224 | B2 | 11/2015 | Ravi |
| 9,348,652 | B2 * | 5/2016 | Raghu .................. G06F 9/5072 |
| 9,696,984 | B2 * | 7/2017 | Zhu .......................... H04L 67/10 |
| 9,753,784 | B2 * | 9/2017 | Nassaur ................ G06F 9/5072 |
| 9,959,108 | B2 * | 5/2018 | Fu ............................. G06F 8/65 |
| 10,031,783 | B2 * | 7/2018 | Jalagam ................ G06F 9/5072 |
| 2004/0148184 | A1 | 7/2004 | Sadiq |
| 2004/0255291 | A1 | 12/2004 | Sierer et al. |
| 2004/0261071 | A1 | 12/2004 | Chuang et al. |
| 2007/0240152 | A1 | 10/2007 | Li et al. |
| 2009/0007105 | A1 | 1/2009 | Fries et al. |
| 2009/0133014 | A1 | 5/2009 | Laurila et al. |
| 2010/0031247 | A1 | 2/2010 | Arnold et al. |
| 2010/0281475 | A1 | 11/2010 | Jain et al. |
| 2011/0055707 | A1 | 3/2011 | Kimmet |
| 2011/0061046 | A1 | 3/2011 | Phillips |
| 2012/0066672 | A1 | 3/2012 | Smith et al. |
| 2012/0084769 | A1 | 4/2012 | Adi et al. |
| 2012/0102481 | A1 | 4/2012 | Mani et al. |
| 2012/0159469 | A1 | 6/2012 | Laor |
| 2012/0240135 | A1 * | 9/2012 | Risbood .............. H04L 41/5012 719/328 |
| 2012/0254850 | A1 | 10/2012 | Hido et al. |
| 2012/0266156 | A1 | 10/2012 | Spivak et al. |
| 2012/0266159 | A1 | 10/2012 | Risbood et al. |
| 2012/0266168 | A1 * | 10/2012 | Spivak .................. G06F 9/5055 718/1 |
| 2012/0311579 | A1 | 12/2012 | Lee et al. |
| 2012/0324116 | A1 | 12/2012 | Dorai et al. |
| 2013/0117749 | A1 | 5/2013 | Mechelke et al. |
| 2013/0152066 | A1 | 6/2013 | Fernandez-Ruiz et al. |
| 2013/0166311 | A1 | 6/2013 | Stock et al. |
| 2013/0185715 | A1 | 7/2013 | Dunning et al. |
| 2013/0232480 | A1 | 9/2013 | Winterfeldt et al. |
| 2014/0130034 | A1 | 5/2014 | Subbu et al. |
| 2014/0137094 | A1 | 5/2014 | Cohen et al. |
| 2014/0173579 | A1 | 6/2014 | McDonald et al. |
| 2014/0304697 | A1 | 10/2014 | Lin et al. |

FOREIGN PATENT DOCUMENTS

| | | |
|---|---|---|
| CN | 103136013 A | 6/2013 |
| JP | 2012252704 A | 12/2012 |
| KR | 20070062335 A | 6/2007 |
| WO | 2012072039 A1 | 6/2012 |
| WO | 2014099176 A1 | 6/2014 |

OTHER PUBLICATIONS

XP055265277. "Topology and Orchestration Specification for Cloud Applications—Version 1.0", Mar. 18, 2013, total 114 pages.

XP011444378. Binz, T. et al., "Portable Cloud Services Using TOSCA", vol. 16, No. 3, May 1, 2012, total 6 pages.

Johannes Wettinger et al.,"Enabling Dynamic Deployment of Cloud Applications Using a Modular and Extensible PaaS Environment",2013 IEEE Sixth International Conference on Cloud Computing,total 8 pages.

Mohamed Sellami et al.,"PaaS-independent Provisioning and Management of Application in the Cloud",2013 IEEE Sixth International Conference on Cloud Computing,total 8 pages.

Anonymous: "Installation (computer programs)—Wikipedia", Aug. 1, 2013, XP055498994, Retrieved from the Internet: URL:https://en.wikipedia.org/w/index.php?title=Installation_(computer_programs)andoldid=566721510. 6 pages.

Anonymous: "System requirements—Wikipedia", Jul. 26, 2013, XP055499001, Retrieved from the Internet: URL: https://en.wikipedia.org/w/index.php?title=System_requirementsandoldid=565884467, 5 pages.

* cited by examiner

APPLICATION UPGRADE METHOD AND APPARATUS

CROSS-REFERENCE TO RELATED APPLICATIONS

This application is a continuation of U.S. patent application Ser. No. 15/618,851, filed on Jun. 9, 2017, which is a continuation of U.S. patent application Ser. No. 14/820,977, filed on Aug. 7, 2015, now U.S. Pat. No. 9,696,984, which is a continuation of International Application No. PCT/CN2013/081410, filed on Aug. 13, 2013. All of the aforementioned patent applications are hereby incorporated by reference in their entireties.

TECHNICAL FIELD

The present invention relates to the field of cloud computing, and in particular, to an application upgrade method and an apparatus.

BACKGROUND

A core idea of cloud computing is to managing and scheduling, in a unified manner, large quantities of computing resources that are connected by using a network, to constitute a computing resource pool to provide a resource and a service for a user according to a user demand. A network providing such a computing resource is called cloud.

A cloud platform is a platform that provides a cloud-based service for an application developer. A PaaS (Platform as a Service) is a common cloud platform and belongs to a common service mode of generalized cloud computing, where the generalized cloud computing means that a developer obtains a required service by using a network in an on-demand easy-to-extend manner. The PaaS provides a middleware platform that is developed in a customized manner, for a user as a service. Essentially, the PaaS converts a resource and a service of the Internet into a programmable interface, to provide a third-party developer with a resource and service platform that has commercial value. The middleware platform, also called a platform node, is a general service having a standard program interface and protocol, and is usually located between hardware and an application or between an operating system and an application. A PaaS CSP (Cloud Service Provider) provides a variety of middleware platforms, for example, an application server and a database. A CSP can design, develop, and optimize a platform node, and an application developer only needs to focus on development of an application node on the platform node, which brings a great convenience to development.

However, the PaaS CSP currently provides an application developer only with a platform node of a fixed version, and maintains a version of a platform node for all applications. If the application developer needs to upgrade an application node, but an upgraded application node has a requirement for the version of the platform node, and if the version of the platform node cannot meet the requirement of the upgraded application node, the application node fails to be updated, and an application cannot run normally.

SUMMARY

Embodiments of the present invention provide an application upgrade method and an apparatus, so as to ensure that an upgraded application can run normally.

To achieve the foregoing objective, the following technical solutions are used in the embodiments of the present invention:

A first aspect of the embodiments of the present invention provides an application upgrade method, including:

receiving an application deployment request, where the application deployment request includes a deployment package of a to-be-deployed application, where the deployment package of the to-be-deployed application describes a node template of the to-be-deployed application, an identifier of a deployed application, an identifier of a node template of the deployed application, an identifier of a first platform node template, a version requirement of the node template of the to-be-deployed application for the first platform node template, and an upgrade identifier indicating that the node template of the to-be-deployed application is used to upgrade the node template of the deployed application indicated by the identifier of the node template of the deployed application;

determining, according to the upgrade identifier, that the deployment package of the to-be-deployed application is an upgrade package of the deployed application indicated by the identifier of the deployed application;

acquiring, according to the identifier of the deployed application, an identifier that is of a first platform node and corresponding to the identifier of the first platform node template, and acquiring a version of the first platform node indicated by the identifier of the first platform node;

determining, according to the version of the first platform node, that the version of the first platform node is below the version requirement of the node template of the to-be-deployed application for the first platform node template;

acquiring, according to the version requirement of the node template of the to-be-deployed application for the first platform node template, a first platform node upgrade package that meets the version requirement of the node template of the to-be-deployed application for the first platform node template;

upgrading the first platform node indicated by the identifier of the first platform node by using the first platform node upgrade package;

determining an identifier of a to-be-upgraded application node; and upgrading the application node indicated by the identifier of the to-be-upgraded application node by using the deployment package of the to-be-deployed application.

With reference to the first aspect, in a first implementable manner, the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

With reference to the first aspect or the first implementable manner, in a second implementable manner, the determining an identifier of a to-be-upgraded application node is specifically: determining identifiers that are of all application nodes and corresponding to the identifier of the node template of the deployed application, as the identifier of the to-be-upgraded application node; or when the deployment package of the to-be-deployed application further includes an identifier that is of at least one deployed application node and corresponding to the identifier of the node template of the deployed application, the determining an identifier of a to-be-upgraded application node is specifically:

determining the identifier that is of the at least one deployed application node, corresponding to the identifier of the node template of the deployed application, and included in the application deployment package, as the identifier of the to-be-upgraded application node.

With reference to the first aspect, the first implementable manner, or the second implementable manner, in a third implementable manner, before the upgrading the first platform node indicated by the identifier of the first platform node, the method further includes: acquiring, according to the identifier of the deployed application, a stored description file of a deployment package of the deployed application;

determining, according to the acquired description file of the deployment package of the deployed application, that the description file of the deployment package of the deployed application describes a second platform node template that uses the first platform node template as a source node template;

acquiring a version requirement of an upgraded first platform node for a second platform node, and a version of the second platform node; and determining that the version of the second platform node is below the version requirement of the upgraded first platform node for the second platform node; and before the upgrading the first platform node by using the first platform node upgrade package, the method further includes:

acquiring, according to the version requirement of the upgraded first platform node for the second platform node, a second platform node upgrade package that meets the version requirement of the upgraded first platform node for the second platform node; and upgrading the second platform node according to the second platform node upgrade package.

A second aspect of the embodiments of the present invention provides an application upgrade method, including:

generating a deployment package of a to-be-deployed application, where the deployment package of the to-be-deployed application describes a node template of the to-be-deployed application, an identifier of a deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the deployed application node template indicated by the identifier of the node template of the deployed application;

generating an application deployment request, where the application deployment request includes the deployment package of the to-be-deployed application; and sending the application deployment request to an application deployment server.

With reference to the second aspect, in a first implementable manner, the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

With reference to the second aspect or the first implementable manner, in a second implementable manner, the deployment package of the to-be-deployed application further includes an identifier that is of at least one deployed application node and corresponding to the identifier of the node template of the deployed application.

With reference to the second aspect, the first implementable manner, or the second implementable manner, in a third implementable manner, before the generating a deployment package of a to-be-deployed application, the method further includes: determining, according to a description file of a deployment package of the deployed application, the first platform node template of the deployed application indicated by the identifier of the deployed application, where the first platform node template uses the node template of the deployed application as a source node template.

A third aspect of the embodiments of the present invention provides an application deployment server, including:

a receiving module, configured to: receive an application deployment request, where the application deployment request includes a deployment package of a to-be-deployed application, where the deployment package of the to-be-deployed application describes a node template of the to-be-deployed application, an identifier of a deployed application, an identifier of a node template of the deployed application, an identifier of a first platform node template, a version requirement of the node template of the to-be-deployed application for the first platform node template, and an upgrade identifier indicating that the node template of the to-be-deployed application is used to upgrade the deployed application node template indicated by the identifier of the node template of the deployed application; and send the application deployment package of the to-be-deployed application to a determining module and an upgrading module;

the determining module, configured to: receive the application deployment package of the to-be-deployed application sent by the receiving module, and determine, according to the upgrade identifier, that the deployment package of the to-be-deployed application is an upgrade package of the deployed application indicated by the identifier of the deployed application; acquire, according to the identifier of the deployed application, an identifier that is of a first platform node and corresponding to the identifier of the first platform node template, and acquire a version of the first platform node indicated by the identifier of the first platform node; determine, according to the version of the first platform node, that the version of the first platform node is below the version requirement of the node template of the to-be-deployed application for the first platform node template; and acquire, according to the version requirement of the node template of the to-be-deployed application for the first platform node template, a first platform node upgrade package that meets the version requirement of the node template of the to-be-deployed application for the first platform node template, and send the first platform node upgrade package to the upgrading module; and the upgrading module, configured to receive the first platform node upgrade package sent by the determining module, and upgrade the first platform node indicated by the identifier of the first platform node by using the first platform node upgrade package;

where the determining module is further configured to determine an identifier of a to-be-upgraded application node according to the identifier of the node template of the deployed application, and send the identifier of the to-be-upgraded application node to the upgrading module; and the upgrading module is further configured to receive the application deployment package of the to-be-deployed application sent by the receiving module, receive the identifier of the to-be-upgraded application node sent by the determining module, and upgrade the application node indicated by the identifier of the to-be-upgraded application node by using the deployment package of the to-be-deployed application.

With reference to the third aspect, in a first implementable manner, the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

With reference to the third aspect or the first implementable manner, in a second implementable manner, the determining module is specifically configured to determine identifiers that are of all application nodes and corresponding to the identifier of the node template of the deployed application, as the identifier of the to-be-upgraded application node; or when the deployment package of the to-be-deployed application further includes an identifier that is of at least one deployed application node and corresponding to the identifier of the node template of the deployed application, the determining an identifier of a to-be-upgraded application node is specifically:

determining the identifier that is of the at least one deployed application node, corresponding to the identifier of the node template of the deployed application, and included in the application deployment package, as the identifier of the to-be-upgraded application node.

With reference to the third aspect, the first implementable manner, or the second implementable manner, in a third implementable manner, the determining module is further configured to:

acquire, according to the identifier of the deployed application, a stored description file of a deployment package of the deployed application;

determine, according to the acquired description file of the deployment package of the deployed application, that the description file of the deployment package of the deployed application describes a second platform node template that uses the first platform node template as a source node template;

acquire a version requirement of an upgraded first platform node for a second platform node, and a version of the second platform node;

determine that the version of the second platform node is below the version requirement of the upgraded first platform node for the second platform node; and acquire, according to the version requirement of the upgraded first platform node for the second platform node, a second platform node upgrade package that meets the version requirement of the upgraded first platform node for the second platform node; and the upgrading module is further configured to:

upgrade the second platform node according to the second platform node upgrade package.

A fourth aspect of the embodiments of the present invention provides a user equipment, including:

a generating module, configured to generate a deployment package of a to-be-deployed application, where the deployment package of the to-be-deployed application describes a node template of the to-be-deployed application, an identifier of a deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the deployed application node template indicated by the identifier of the node template of the deployed application, where the generating module is further configured to generate an application deployment request, and send the application deployment request to a sending module, where the application deployment request includes the deployment package of the to-be-deployed application; and the sending module, configured to receive the application deployment request sent by the generating module, and send the application deployment request to an application deployment server.

With reference to the fourth aspect, in a first implementable manner, the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

With reference to the fourth aspect or the first implementable manner, in a second implementable manner, the deployment package of the to-be-deployed application further includes an identifier that is of at least one deployed application node and corresponding to the identifier of the node template of the deployed application.

With reference to the fourth aspect, the first implementable manner, or the second implementable manner, in a third implementable manner, the user equipment further includes: a determining module, configured to determine, according to a description file of a deployment package of the deployed application, the first platform node template of the deployed application indicated by the identifier of the deployed application, where the first platform node template uses the node template of the deployed application as a source node template.

A fifth aspect of the embodiments of the present invention provides an application deployment server, including:

a receiver, configured to receive an application deployment request, where the application deployment request includes a deployment package of a to-be-deployed application, where the deployment package of the to-be-deployed application describes a node template of the to-be-deployed application, an identifier of a deployed application, an identifier of a node template of the deployed application, an identifier of a first platform node template, a version requirement of the node template of the to-be-deployed application for the first platform node template, and an upgrade identifier indicating that the node template of the to-be-deployed application is used to upgrade the deployed application node template indicated by the identifier of the node template of the deployed application; and send the deployment package of the to-be-deployed application to a processor; and the processor, configured to:

receive the deployment package of the to-be-deployed application sent by the receiver, and determine, according to the upgrade identifier, that the deployment package of the to-be-deployed application is an upgrade package of the deployed application indicated by the identifier of the deployed application;

acquire, according to the identifier of the deployed application, an identifier that is of a first platform node and corresponding to the identifier of the first platform node template, and acquire a version of the first platform node indicated by the identifier of the first platform node;

determine, according to the version of the first platform node, that the version of the first platform node is below the version requirement of the node template of the to-be-deployed application for the first platform node template;

acquire, according to the version requirement of the node template of the to-be-deployed application for the first platform node template, a first platform node upgrade package that meets the version requirement of the node template of the to-be-deployed application for the first platform node template;

upgrade the first platform node indicated by the identifier of the first platform node template by using the first platform node upgrade package;

determine an identifier of a to-be-upgraded application node; and upgrade the application node indicated by the identifier of the to-be-upgraded application node by using the deployment package of the to-be-deployed application.

With reference to the fifth aspect, in a first implementable manner, the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

With reference to the fifth aspect or the first implementable manner, in a second implementable manner, the processor is specifically configured to determine identifiers that are of all application nodes and corresponding to the identifier of the node template of the deployed application, as the identifier of the to-be-upgraded application node; or when the deployment package of the to-be-deployed application further includes an identifier that is of at least one deployed application node and corresponding to the identifier of the node template of the deployed application, the determining an identifier of a to-be-upgraded application node is specifically:

determining the identifier that is of the at least one deployed application node, corresponding to the identifier of the node template of the deployed application, and included in the application deployment package, as the identifier of the to-be-upgraded application node.

With reference to the fifth aspect, the first implementable manner, or the second implementable manner, in a third implementable manner, the processor is further configured to:

acquire, according to the identifier of the deployed application, a stored description file of a deployment package of the deployed application;

determine, according to the acquired description file of the deployment package of the deployed application, that the description file of the deployment package of the deployed application describes a second platform node template that uses the first platform node template as a source node template;

acquire a version requirement of an upgraded first platform node for a second platform node, and a version of the second platform node;

determine that the version of the second platform node is below the version requirement of the upgraded first platform node for the second platform node;

acquire, according to the version requirement of the upgraded first platform node for the second platform node, a second platform node upgrade package that meets the version requirement of the upgraded first platform node for the second platform node; and upgrade the second platform node according to the second platform node upgrade package.

A sixth aspect of the embodiments of the present invention provides a user equipment, including:

a processor, configured to: generate a deployment package of a to-be-deployed application, where the deployment package of the to-be-deployed application describes a node template of the to-be-deployed application, an identifier of a deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the deployed application node template indicated by the identifier of the node template of the deployed application;

generate an application deployment request, where the application deployment request includes the deployment package of the to-be-deployed application; and send the application deployment request to a transmitter; and the transmitter, configured to receive the application deployment request sent by the processor, and send the application deployment request to an application deployment server.

With reference to the sixth aspect, in a first implementable manner, the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

With reference to the sixth aspect or the first implementable manner, in a second implementable manner, the deployment package of the to-be-deployed application further includes an identifier that is of at least one deployed application node and corresponding to the identifier of the node template of the deployed application.

With reference to the sixth aspect, the first implementable manner, or the second implementable manner, in a third implementable manner, the processor is further configured to: determine, according to a description file of a deployment package of the deployed application, the first platform node template of the deployed application indicated by the identifier of the deployed application, where the first platform node template uses the node template of the deployed application as a source node template.

It can be known from the foregoing solutions that an application description file in a deployment package of a to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1A:
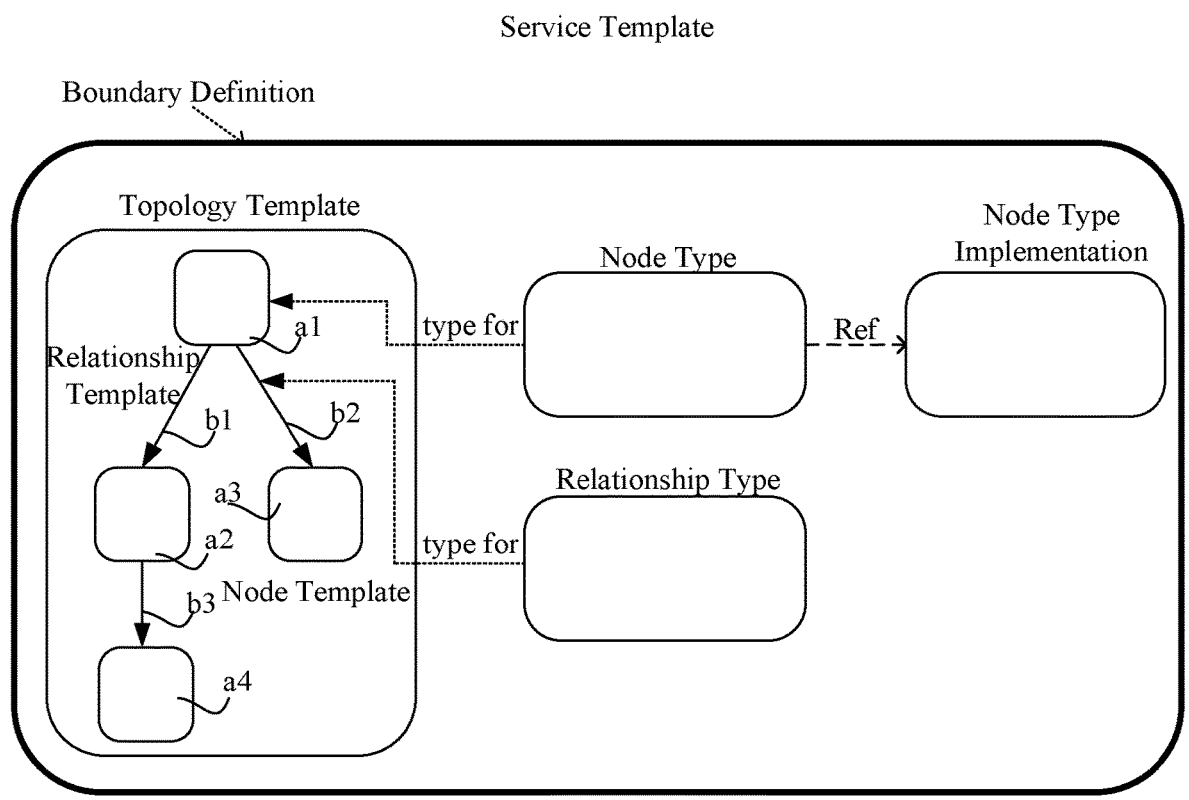
FIG. 1A is a schematic structural diagram of a service template described by an application deployment description file on which an application upgrade method is based according to an embodiment of the present invention.

An embodiment of the present invention provides an application upgrade method that may be applied to a TOSCA standard, or may be applied to another aspect and is not limited to the TOSCA standard. As shown in FIG. 1A, the application upgrade method includes:

In the embodiment of the present invention, information required for deploying an application is described in an application deployment package named cloud service archive (Cloud Service Archive, CSAR for short) on an application deployment server. The application deployment package includes at least one application deployment description file with a file name extension of ste. The *.ste application deployment description file may use an XML language to describe deployment information of an application. A root element of the *.ste application deployment description file is a Service Template. That is, in the embodiment of the present invention, the Service Template may be used to completely describe information about an application that needs to be deployed. Subelements of the *.ste application deployment description file include a topology template TopologyTemplate, a node type NodeType, a node template NodeTemplate, a relationship type RelationshipType, a relationship template RelationshipTemplate, a boundary definition BoundaryDefinitions, and the like. A relationship between the root element and the subelement in the application deployment description file is shown in FIG. 1A. FIG. 1A is schematic structural diagram of a service template described by an application deployment description file on which an application upgrade method is based according to an embodiment of the present invention.

As shown in FIG. 1A, in the embodiment of the present invention, TopologyTemplate is used to depict an application topology. The application topology includes node templates for four nodes a1, a2, a3, and a4, that is, each node template represents one node of one application deployment (that is, if an application is deployed multiple times, each node template corresponds to multiple nodes of this type). An identifier of each node template is provided in the application topology. A type of each NodeTemplate is defined by NodeType (a type attribute of NodeTemplate that describes NodeType corresponding to NodeTemplate).

NodeType defines an attribute (defined by Properties) of a node, an interface (defined by an interface set Interfaces) of the node, and the like. NodeTemplate is an instance of NodeType.

Each NodeType corresponds to one node type implementation (NodeType Implementation, NTI for short). The NTI describes information about a deployment artifact of a node corresponding to NodeType and information about method artifacts of all methods included in Interface in NodeType.

Each arrow line connecting to a node in the application topology, (TopologyTemplate) is one RelationshipTemplate. A relationship template corresponds to an application node template.

Figure 1B:
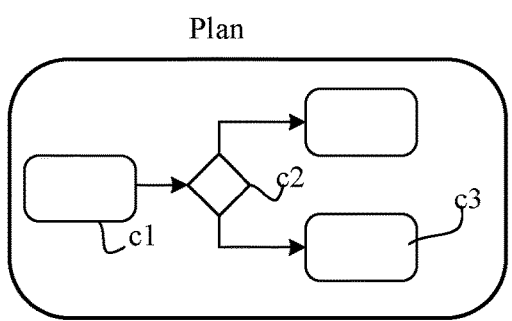
FIG. 1B is a schematic structural diagram of a plan corresponding to FIG. 1A according to an embodiment of the present invention.

Each application deployment package further includes a plan (Plan), as shown in FIG. 1B. FIG. 1B is a schematic structural diagram of a plan corresponding to FIG. 1A according to an embodiment of the present invention. The plan is an executable workflow, and actually, is a workflow including multiple referenced methods. Executing the workflow is actually executing a method artifact corresponding to each method forming the workflow. When the plan is executed, an application deployment server runs, according to a definition in the plan, a method artifact corresponding to a method corresponding to each task in sequence. For example, referring to FIG. 1B, the plan includes tasks c1, c2, and c3. According to the definition in the plan, when the plan is executed, the task c1, the task c2, and the task c3 are executed in sequence, where the c1, c2, and c3 are methods corresponding to Interface in a NodeType.

In addition, each ServiceTemplate includes a boundary (defined by a BoundaryDefinitions). Some components defined within ServiceTemplate are presented to a user in BoundaryDefinitions, where the components are the foregoing NodeTemplate, deployment artifact, method artifact, and the like.

It can be known from the foregoing description that one application deployment package includes information required for deploying an application, for example, an application deployment description file, a plan, a deployment artifact of a node, and a method artifact of each method. The application deployment description file describes a complete topology of the application, information about a deployment artifact of a node in the topology, information about a method in a node template in the topology, and information and a step of a method artifact of the node template in the topology.

Particularly, node templates and a logical relationship between the node templates are described in the topology. In the embodiment of the present invention, the node templates in the topology may include: an application node template and a platform node template. The application node template refers to a node of a to-be-deployed application that is maintained and used by a user equipment, and the platform node template refers to a node of a to-be-deployed application that is run and maintained by a server.

Figure 2:
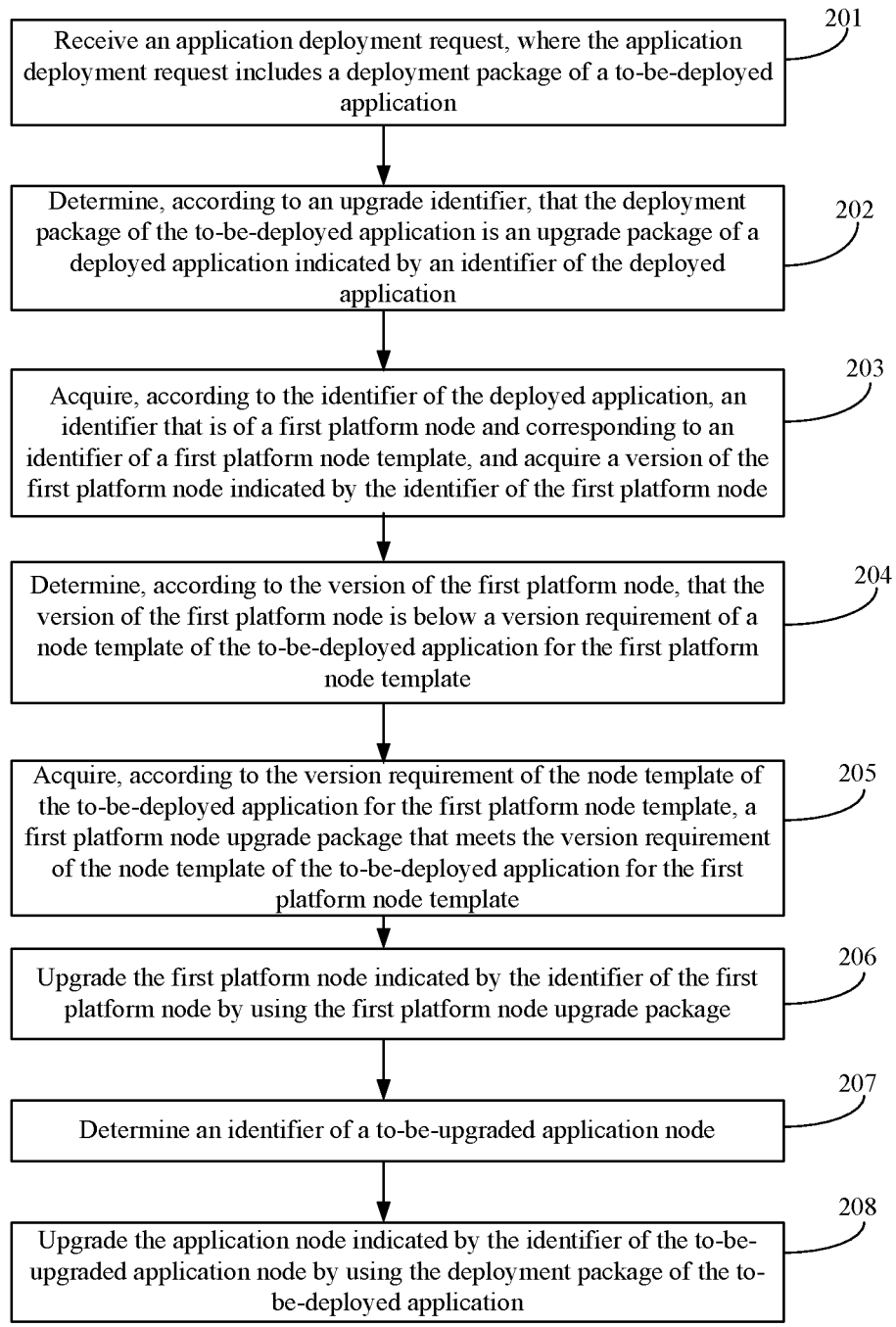
FIG. 2 is a schematic flowchart of an application upgrade method according to an embodiment of the present invention.

FIG. 2 is a schematic flowchart of an application upgrade method according to an embodiment of the present invention. The method in this embodiment is executed by an application deployment server. As shown in FIG. 2, the method includes:

Step 201. Receive an application deployment request, where the application deployment request includes a deployment package of a to-be-deployed application. The deployment package of the to-be-deployed application describes a node template of the to-be-deployed application, an identifier of a deployed application, an identifier of a node template of the deployed application, an identifier of a first platform node template, a version requirement of the node template of the to-be-deployed application for the first platform node template, and an upgrade identifier indicating that the node template of the to-be-deployed application is used to upgrade the node template of the deployed application indicated by the identifier of the node template of the deployed application.

Specifically, the node template of the to-be-deployed application, the identifier of the deployed application, the identifier of the first platform node template, the identifier of the node template of the deployed application, the version requirement of the node template of the to-be-deployed application for the first platform node template, and the upgrade identifier indicating that the node template of the to-be-deployed application is used to upgrade the node template of the deployed application indicated by the identifier of the node template of the deployed application are all described in an application description file. A platform node template indicated by the identifier of the first platform node template and an application node template indicated by the identifier of the node template of the deployed application are described in a description file in an application deployment package indicated by the identifier of the deployed application.

In the embodiment of the present invention, the upgrade identifier indicating that the node template of the to-be-deployed application is used to upgrade the node template of the deployed application indicated by the identifier of the node template of the deployed application may be represented by Patch For. The upgrade identifier refers to an upgrade identifier indicating that the node template of the to-be-deployed application is used to upgrade the node template of the deployed application indicated by the identifier of the node template of the deployed application. The deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

It should be noted that one deployed application includes multiple nodes, where a node is equivalent to a module, for example, a charging application includes a database module, a management module, and the like. When an application needs to be deployed, a user equipment generates a deployment package of the to-be-deployed application and sends the deployment package of the to-be-deployed application to an application deployment server by using an application deployment request. After receiving the application deployment package, the application deployment server performs application deployment according to an application deployment description file, a deployment artifact, a method artifact, and a plan of the application deployment package. Particularly, the application deployment includes initial deployment, an update, an upgrade, or the like. In the embodiment of the present invention, it is assumed that the deployment package of the to-be-deployed application is an upgrade package for upgrading a deployed application.

Particularly, each time an application deployment package is received, the application deployment server records all application description information in the application deployment package in a database.

Step 202. Determine, according to the upgrade identifier, that the deployment package of the to-be-deployed application is an upgrade package of the deployed application indicated by the identifier of the deployed application.

Specifically, the application deployment server determines, according to the upgrade identifier carried in the relationship template that describes the node template of the to-be-deployed application, or according to the upgrade identifier carried in the node type implementation corresponding to the node template of the to-be-deployed application, that the deployment package of the to-be-deployed application is the upgrade package for the deployed application.

Step 203. Acquire, according to the identifier of the deployed application, an identifier that is of a first platform node and corresponding to the identifier of the first platform node template, and acquire a version of the first platform node indicated by the identifier of the first platform node.

Specifically, the application deployment server stores a version or a capability of each node of each deployed application. The application deployment server acquires, from stored version information of each platform node of the deployed application and according to the identifier of the deployed application, the version of the first platform node corresponding to the identifier of the first platform node template. Moreover, according to the version requirement of the node template of the to-be-deployed application for the first platform node template and the acquired version of the first platform node, the application deployment server determines that the version of the first platform node is below the version requirement of the node template of the to-be-deployed application for the first platform node template.

That the version of the first platform node is below the version requirement of the node template of the to-be-deployed application for the first platform node template means that a version number of the version of the first platform node is less than a version number indicated by the version requirement of the node template of the to-be-deployed application for the first platform node template.

Step 204. Determine, according to the version of the first platform node, that the version of the first platform node is below the version requirement of the node template of the to-be-deployed application for the first platform node template.

Step 205. Acquire, according to the version requirement of the node template of the to-be-deployed application for the first platform node template, a first platform node upgrade package that meets the version requirement of the node template of the to-be-deployed application for the first platform node template.

Specifically, the application deployment server acquires, according to the version requirement of the node template of the to-be-deployed application for the first platform node template, the first platform node upgrade package that meets the version requirement of the node template of the to-be-deployed application for the first platform node template.

Step 206. Upgrade the first platform node indicated by the identifier of the first platform node by using the first platform node upgrade package.

Optionally, the deployment package of the to-be-deployed application may not include an identifier of a deployed application node. When the application deployment package does not include the identifier of the deployed application node, the application deployment server may acquire, according to the identifier of the deployed application, identifiers that are of all first platform nodes and corresponding to the identifier of the first platform node template, and use the first platform node upgrade package to upgrade the first platform node indicated by the identifier of each first platform node.

The upgrade process is the same as an upgrade process in the prior art, and details are not described again in the present invention.

Step 207. Determine an identifier of a to-be-upgraded application node.

Specifically, the application deployment server may determine identifiers that are of all application nodes and corresponding to the identifier of the node template of the deployed application, as the identifier of the to-be-upgraded application node.

Alternatively, when the deployment package of the to-be-deployed application further includes an identifier that is of at least one deployed application node and corresponding to the identifier of the node template of the deployed application, the determining an identifier of a to-be-upgraded application node is specifically: determining the identifier that is of the at least one deployed application node, corresponding to the identifier of the node template of the deployed application, and included in the application deployment package, as the identifier of the to-be-upgraded application node.

Step 208. Upgrade the application node indicated by the identifier of the to-be-upgraded application node by using the deployment package of the to-be-deployed application.

Optionally, when the application deployment package includes the identifier that is of the at least one application node and corresponding to the identifier of the node template of the deployed application, the application deployment server may use the deployment package of the to-be-deployed application to upgrade the application node indicated by the identifier of the deployed application node.

Optionally, the upgrading the application node indicated by the identifier of the to-be-upgraded application node is specifically: acquiring identifiers that are of all deployed application nodes and corresponding to the identifier of the node template of the deployed application; and upgrading the application node indicated by the identifier of each deployed application node by using the deployment package of the to-be-deployed application.

Because the deployment package of the to-be-deployed application is an upgrade package, a plan (plan) of the deployment package of the to-be-deployed application is an upgrade plan. A corresponding application node can be upgraded according to the upgrade plan.

Therefore, an application description file in a deployment package of a to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

Before step 206, a stored description file of a deployment package of the deployed application is acquired according to the identifier of the deployed application; it is determined, according to the acquired description file of the deployment package of the deployed application, that the description file of the deployment package of the deployed application describes a second platform node template that uses the first platform node template as a source node template; a version requirement of an upgraded first platform node for a second platform node, and a version of the second platform node are acquired; and it is determined that the version of the second platform node is below the version requirement of the upgraded first platform node for the second platform node. Before the upgrading the first platform node by using the first platform node upgrade package, the method further includes: acquiring, according to the version requirement of the upgraded first platform node for the second platform node, a second platform node upgrade package that meets the version requirement of the upgraded first platform node for the second platform node; and upgrading the second platform node according to the second platform node upgrade package.

In addition, the acquiring a version of the second platform node is specifically: acquiring an identifier of the second platform node according to an identifier of the second platform node template and the identifier of the first platform node, where the identifier of the second platform node corresponds to the identifier of the second platform node template and a deployment number is the same as a number corresponding to the identifier of the first platform node.

Further, after determining that the description file of the deployment package of the deployed application describes the second platform node template that uses the first platform node template as the source node template, the application deployment server acquires the version requirement of the upgraded first platform node for the second platform node, and the version of the second platform node.

Figure 3:
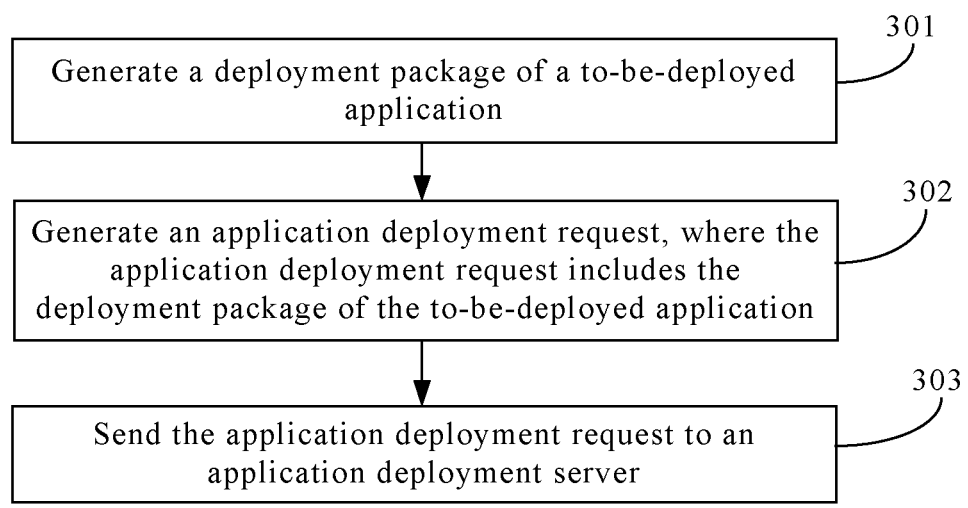
FIG. 3 is a schematic flowchart of an application upgrade method according to an embodiment of the present invention.

An embodiment of the present invention provides an application upgrade method. The method may be executed by a user equipment. As shown in FIG. 3, the method includes:

Step 301. Generate a deployment package of a to-be-deployed application, where the deployment package of the to-be-deployed application describes a node template of the to-be-deployed application, an identifier of a first platform node template, an identifier of a node template of a deployed application, a version requirement of the node template of the to-be-deployed application for the first platform node template, and an upgrade identifier indicating that the node template of the to-be-deployed application is used to upgrade the node template of the deployed application indicated by the identifier of the node template of the deployed application.

The deployment package of the to-be-deployed application further includes a relationship template that describes the node template of the to-be-deployed application, and the upgrade identifier is carried in the relationship template that describes the node template of the to-be-deployed application; or the deployment package of the to-be-deployed application further includes a node type implementation corresponding to the node template of the to-be-deployed application, and the upgrade identifier is carried in the node type implementation. The upgrade identifier is an upgrade identifier indicating that the node template of the to-be-deployed application is used to upgrade the node template of the deployed application indicated by the identifier of the node template of the deployed application.

Step 302. Generate an application deployment request, where the application deployment request includes the deployment package of the to-be-deployed application.

Step 303. Send the application deployment request to an application deployment server.

It can be known from the foregoing solution that an application description file in a deployment package of a to-be-deployed application describes a version requirement of a node template of the to-be-deployed application for a first platform node template. Therefore, when determining that a version of a first platform node is below the version requirement of the node template of the to-be-deployed application for the first platform node template, an application deployment server may acquire a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally. Specifically, after receiving the deployment package of the to-be-deployed application, the application deployment server may execute any action executed by the application deployment server that is described in FIG. 2. Details are not described again in the embodiment of the present invention.

Further, the deployment package of the to-be-deployed application may further include an identifier that is of at least one deployed application node and corresponding to the identifier of the node template of the deployed application, so that the application deployment server uses the deployment package of the to-be-deployed application to upgrade the application node indicated by the identifier of the deployed application node.

Particularly, before step 301, the method further includes: determining, according to a description file of a deployment package of the deployed application, the first platform node template of the deployed application indicated by an identifier of the deployed application, where the first platform node template uses the node template of the deployed application as a source node template.

In this way, an application description file in a deployment package of a to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

Figure 4:
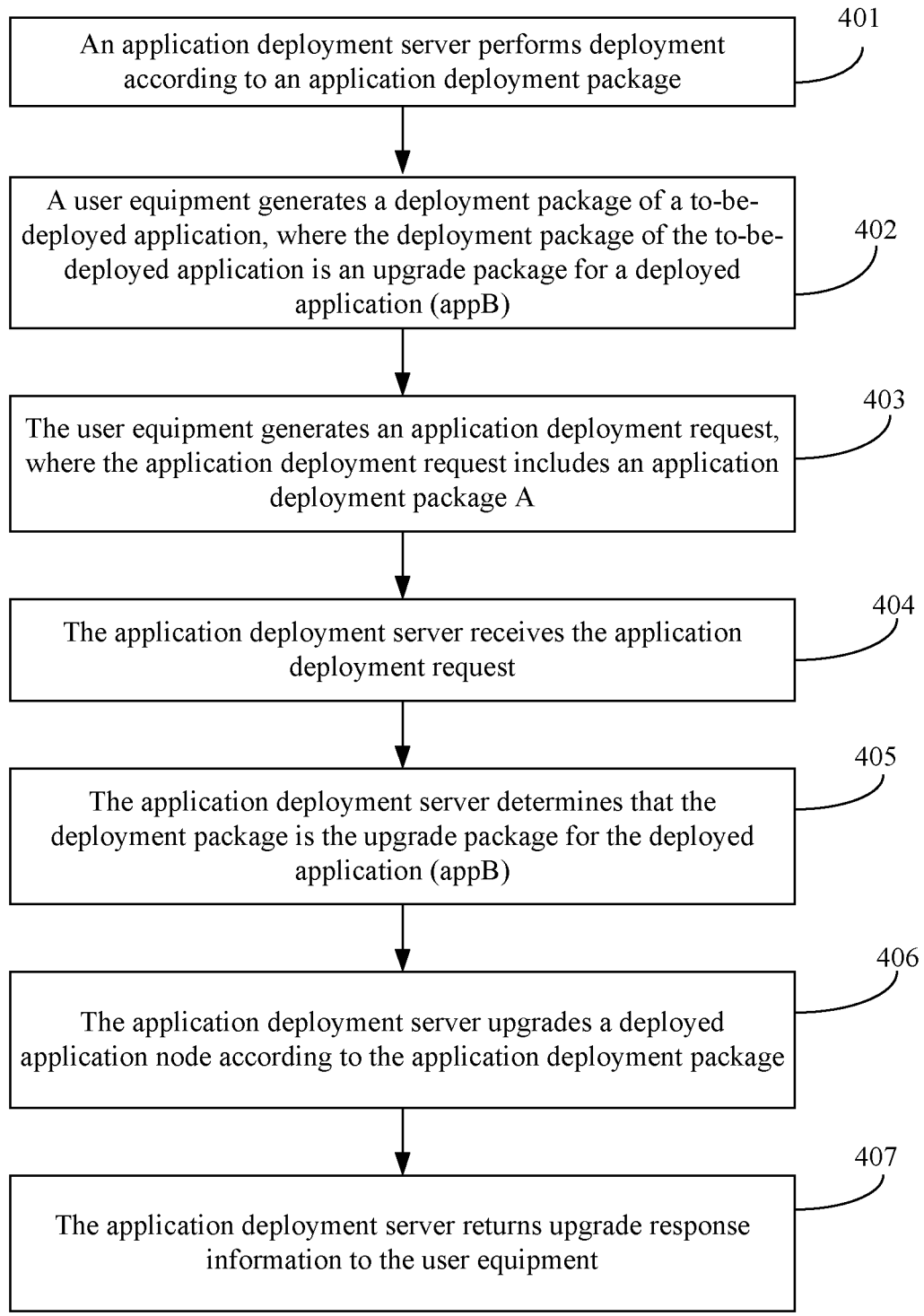
FIG. 4 is a schematic flowchart of an application upgrade method according to an embodiment of the present invention.

An embodiment of the present invention provides an application upgrade method. It is assumed that the application upgrade method is applied to the TOSCA standard. As shown in FIG. 4, the application upgrade method includes:

Step 401. An application deployment server performs deployment according to an application deployment package.

A process of performing deployment according to the application deployment package is the same as that in the prior art. In the embodiment of the present invention, it is assumed that an application deployment package that is submitted by a user equipment to the application deployment server is an application deployment package B, and an identifier of the application deployment package B (that is, an identifier of an application) is appB. A description file in the application deployment package describes a node template app, a node template apache, a node template javaModule, a relationship template that describes a deployment requirement (for example, a version requirement) of the node template app for the node template apache, and a relationship template that describes a deployment requirement of the node template apache for the node template javaModule. The node template app is a node template of an application deployed by using the application deployment package B, and the user equipment is responsible for providing a resource. That is, the application deployment package B includes a deployment artifact, a method artifact, and the like for the node template app. The node template apache and the node template javaModule are platform node templates, and a CSP server is responsible for providing a resource and ensures that the provided resource meets all deployment requirements in the application deployment package. It is assumed that the application deployment server successfully deploys and runs the application according to the application deployment package B, and writes content in the foregoing two relationship templates into an application information table that is in a database and is maintained by the application deployment server, as shown in Table 1. In the embodiment of the present invention, the application appB that is successfully deployed and run is called a deployed application.

TABLE 1

Application information table

| Application identifier | Identifier of source node template | Identifier of destination node template | Deployment requirement |
| --- | --- | --- | --- |
| appB | app | apache | RequirementForApache |
| appB | apache | javaModule | RequirementForJM |

Step 402. A user equipment generates a deployment package of a to-be-deployed application. The deployment package of the to-be-deployed application is an upgrade package for a deployed application (appB).

It is assumed that the upgrade package for the deployed application (that is, the deployment package of the to-be-deployed application) is an application deployment package A. The application deployment package A can be used to upgrade an application node corresponding to the application node template app (that is, the identifier of the node template of the deployed application). Specifically, after receiving the application deployment package appA, the application deployment server deploys the application according to appA, and generates nodes such as an application node and a platform node for the node templates in appA, so that the node templates correspond to nodes that are successfully deployed and run.

A description file of the application deployment package A describes a node template appPatch of the to-be-deployed application, and describes an upgrade identifier of the node template app of the deployed application in a relationship template that describes the node template appPatch of the to-be-deployed application. Further, the upgrade identifier may also be described in an NTI corresponding to the node template appPatch of the to-be-deployed application.

Further, before generating the application deployment package A, the user equipment further needs to determine, according to the description file of appB, that the application node template app is used as a source node template and a platform node template is used as a destination platform node template in a relationship template that describes the node template app of the to-be-deployed application node. For example, it can be known, by analyzing content described in the relationship template in the description file of appB, that the application node template app is used as the source node template and the platform node template apache is used as the destination node template. Therefore, the user equipment describes, in the description file of the application deployment package A, a version requirement of the node template appPatch of the to-be-deployed application for the platform node template apache of the deployed application. Specifically, content of the version requirement is determined by the user equipment according to content of an upgrade of an application node. For example, it is required that the platform node template apache support Servlet 3.0, and therefore a platform node apache needs to be upgraded to Tomcat 7.0. The version requirement indicates that, after the application node corresponding to the application node template app is upgraded by using appA, an upgraded application node corresponding to the application node template app can run normally only when a platform node corresponding to the platform node template apache supports Servlet 3.0 (that is, the platform node needs to be upgraded to Tomcat 7.0).

Specifically, a manner of acquiring, by the user equipment, the description file of appB may be: acquiring the description file of appB from files stored by the user equipment, or acquiring the description file of appB by sending a request to the application deployment server.

The application deployment package A further provides a deployment artifact and a method artifact of the application node template appPatch, where the method artifact is patchApp. In the embodiment of the present invention, for ease of description, a platform node template in the version requirement of the node template appPatch of the to-be-deployed application for the platform node template of the deployed application is referred to as a first platform node template, and another platform node template in a version requirement of the first platform node template for the another platform node template is referred to as a second platform node template. Specifically, the version requirement may be a version requirement, and the version requirement may be a specific version number or a capability that a version provides.

Figure 5:
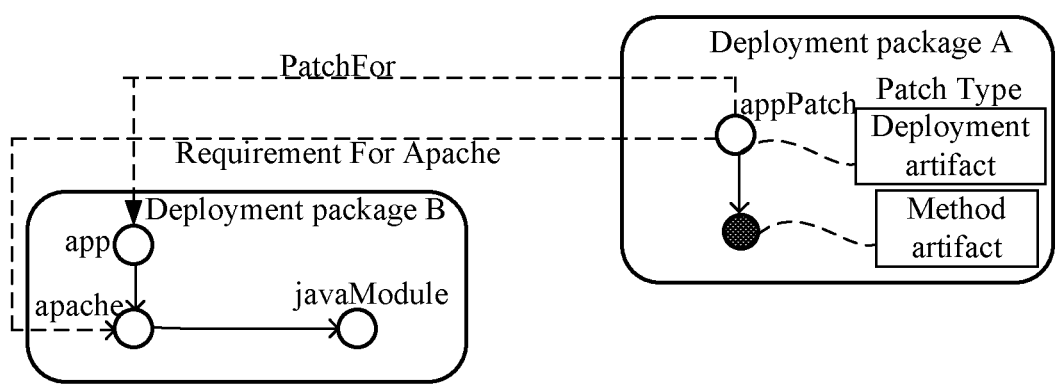
FIG. 5 is a schematic diagram of determining, by an application deployment server according to a description of an application deployment package A and a description of an application deployment package B, an upgrade of an application node app in an embodiment of the present invention.

An application identifier of the application deployment package A is appA, and an identifier of the application node template is appPatch. FIG. 5 is a schematic diagram of determining, by the application deployment server according to a description of the application deployment package A and a description of the application deployment package B, an upgrade of the application node app in an embodiment of the present invention. As shown in FIG. 5, according to the description file of the application deployment package A, it can be known that an application node template appPatch described in the application deployment package A is an upgrade node for the application node template app described in the deployment package B of the deployed application. For example, a PatchFor field is used to describe an identifier (such as an upgrade identifier) of a relationship between the two node templates. Certainly, the upgrade identifier may also be described by using another field, which is not limited in the embodiment of the present invention. In addition, the application deployment package A further describes the version requirement of the application node template appPatch for the platform node template apache described in the deployment package B of the deployed application, where the version requirement is expressed in a form of RequirementForApache (Apache is a platform node template). PatchForApp indicates that the appPatch node template in the application deployment package A is used for an upgrade of the app application node template. RequirementForApache describes the version requirement of the application node template appPatch for the platform node template apache. The application deployment package B is a deployment package of a deployed application, and appA is for the upgrade of the application node template app. Therefore, in appA, some elements described in an application description file appB.tosca of the application deployment package B need to be invoked. The description file of appB needs to be imported to the description file of appA. For example, a URL (UniformResourceLocator) of the appB.tosca file can be provided by using a location attribute. A specific invocation program is as follows:

```
<Import namespace="appB:http://www.example.com/ste/Topology"
    location=http://www.example.com/ste/appB.tosca
    importType=" http://docs.oasis-open.org/tosca/ns/2011/12"/>
```

For example, in a TopologyTemplate element of appA.tosca, a description of an application topology structure shown in FIG. 5 is provided, and may be specifically as follows:

```
<TopologyTemplate>
    <NodeTemplate identifier="appPatch" type="apppatchtype">
        <Requirements>
            <Requirement    name="   requirementOfApp"    //The    version
requirement of appPatch is provided.
            type=" webAppContainerRequirement"/>
        </Requirements>
        <DeploymentArtifacts>
            <DeploymentArtifact name="DaOfAppPatch" artifactType="Patch">
//A deployment artifact type is Patch.
            ......//Specific description of a deployment artifact
            </DeploymentArtifact>
        </ DeploymentArtifacts >
    </NodeTemplate>
        <RelationshipTemplate identifier="PatchForApp" type="PatchFor"> //A
logical relationship is PatchFor.
            <SourceElement ref="appPatch"/> //A source in the logical relationship
is appPatch.
            <TargetElement externalref="appB:app"/> //A target in the logical
relationship is app.
        </RelationshipTemplate>
            <RelationshipTemplate    identifier="RequirementForApache"    >
//Requirement relationship
            <SourceElement    ref="requirementOfAppPatch"/>    //Version
requirement of a source appPatch in the requirement relationship
            <TargetElement         externalref="appB:capabilityOfApache"/>
//Deployment capability of a target apache in the requirement relationship
        </RelationshipTemplate>
        ......//Another definition
    <Plans>
        <Plan                                   identifier="upgrade"
planType="http://www.example.com/UpgradePlan" >//Upgrade plan
            ......//Another management plan
    </Plan>
</TopologyTemplate>
```

Specifically, the application deployment package A uses, in the topology template TopologyTemplate, the node template NodeTemplate element to define the application node template appPatch, and specifies the version requirement requirementOfApp and the deployment artifact DaOfAppPatch in the node template element. PatchForApp in the relationship template is used to specify that an upgrade identifier, such as PatchFor, of a relationship exists in the appPatch application node template and the app application node template in the application deployment package B. In the upgrade identifier PatchForApp, SourceElement is used to specify an identifier appPatch of a source application node template (an identifier of a node template of a to-be-deployed application), and TargetElement is used to specify an identifier appB:app of a target application node template (an identifier of a node template of a deployed application). In the description of TargetElement, the attribute "external-ref" specifies that the application node template app is defined in an external application description file, and the prefix "appB" and the "Import" element are used to specify that the external application description file is appB.tosca. In addition, RequirementForApache of the relationship template RelationshipTemplate defines the version requirement of the appPatch application node template for Apache in the application deployment package B. In the requirement relationship RequirementForApache, SourceElement is used to define the source version requirement requirementOfApp-Patch, and TargetElement is used to define the target deployment capability appB:capabilityOfApache. In the description of TargetElement, the attribute "externalref" specifies that the deployment capability capabilityOfApache is defined in the external application description file, and the prefix "appB" and the "Import" element are used to specify that the external application description file is appB.tosca. In the topology, the upgrade plan upgrade is also defined, and a type of the upgrade plan is http://www.example.com/UpgradePlan.

A node type NodeType of the application node template appPatch is described as follows:

```
<NodeType name="apppatchtype">
    <Interfaces>
        <Interface name="patchAppInterface">
            <OperationName="patchApp"/> //Define a method patchApp.
        </Interface>
    </Interfaces>
    <RequirementDefinitions> //Definition of a version requirement of a node
appPatch
            <RequirementDefinition name="requirementOfAppPatch"
    requirementType="webAppContainerRequirement">
                <Constraints>
                        <Constraint                       constraintType=
"http://www.example.com/
                                            PropertyConstraints/supportServlet3"/>
                </Constraints>
            </RequirementDefinition>
        </RequirementDefinitions>
</NodeType>
```

In this NodeType, the definition of the method artifact patchApp of the application node template appPatch and the definition of the version requirement requirementOfApp-Patch are provided. The method artifact patchApp is invoked when the application deployment server implements the upgrade plan. For the constraint Constraint field in the version requirement requirementOfAppPatch, a value of the attribute constraint type constraintType of the Constraint field is http://www.example.com/PropertyConstraints/supportServlet3, indicating that the application deployment server needs to search a database according to the foregoing value, to find which software version includes a capability of supportServlet3.

It should be noted that the description file of the application deployment package A may further include an identifier such as app1 of a deployed application node. The identifier of the deployed application node is an identifier of an application node that needs to be upgraded. An identifier such as app of a to-be-upgraded application node template may also be specified by the upgrade identifier such as apptchFor in the foregoing description. If the description file of the application deployment package A does not separately indicate the identifier of the deployed application node, and only the identifier such as app of the node template of the deployed application is indicated in the upgrade identifier, then the application deployment server upgrades, when performing an application upgrade, all application nodes corresponding to the identifier app of the node template of the deployed application. For example, if appB is first deployed in Nanjing and then is deployed in Shanghai, application nodes corresponding to the identifier of the node template of the deployed application are: an application node app1 in Nanjing and an application node app2 in Shanghai. A number is generated each time an application is deployed. For example, when appB is deployed in Nanjing, a number 1 is generated, indicating that app1 is generated when appB is deployed for a first time; when appB is deployed in Shanghai, a number 2 is generated, indicating that app2 is generated when appB is deployed for a second time. The number can be used to determine which nodes are generated in a same deployment. When the deployment package of the to-be-deployed application includes the identifier of the deployed application node, a plan in the deployment package appA may be as follows:

```
<Plan                                 identifier="upgrade"
planType="http://www.example.com/UpgradePlan" >
        <InputParameters>
            <InputParameter         name="appInstance
identifier" type="string">app1</InputParameter >
            <InputParameter name="stopPlan identifier"
type="string">stop</InputParameter >
            <InputParameter name="startPlan identifier"
type="string"  >start</InputParameter >
        </InputParameters>
    <PlanModel>
        invokePlan(appInstance identifier, stopplan identifier);
        patchApp(appInstance identifier);
        invokePlan(appInstance identifier, startPlan identifier);
        </PlanModel>
    </Plan>
```

In this description, the input parameter is first defined. The input parameter "appInstance identifier" specifies that the identifier of the deployed application node is app1. The interface invokePlan is an API that is provided by the application deployment server for the user equipment. The user equipment can invoke the API to access a management plan that is defined in the application deployment package A. The API has two parameters, where a first parameter is the identifier of the deployed application node, and a second parameter is an identifier of a plan that needs to be invoked. Each step of the plan is provided in the plan model Plan-Model element.

When the application deployment package A does not specify the identifier of the deployed application node, an upgrade plan is as follows:

```
        <Plan                 identifier="upgrade"
    planType="http://www.example.com/UpgradePlan" >
            <InputParameters>
                <InputParameter name="stopPlan identifier"
    type="string">stop</InputParameter >
                <InputParameter name="startPlan identifier"
    type="string"  >start</InputParameter >
            </InputParameters>
            <PlanModel>
              appB: stopplan//Defined in appB.tosca
              patchApp;
              appB: startplan//Defined in appB.tosca
              </PlanModel>
            </Plan>
```

The identifier of the deployed application node is not specified in this description. Therefore, the application deployment server acquires the identifier app of the node template of the deployed application, finds, according to the application identifier appB, identifiers (such as app1 and app2) that are of all deployed application nodes and corresponding to the identifier app of the node template of the deployed application, and upgrades all the deployed application nodes corresponding to the identifier app of the node template of the deployed application. The user equipment directly executes "appB: plan" to invoke the plan defined in appB.tosca to generate the upgrade.

The foregoing program may enable the application deployment server to learn that the identifier of the deployed application is "appB" and the application node corresponding to the identifier "app" of the node template of the deployed application needs to be upgraded.

Step 403. The user equipment generates an application deployment request, where the application deployment request includes an application deployment package A.

Step 404. The application deployment server receives the application deployment request.

Step 405. The application deployment server determines that the deployment package is the upgrade package for the deployed application (appB).

Specifically, the description file of the deployment package of the to-be-deployed application may describe a node template of the to-be-deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the node template of the deployed application.

The application deployment server determines, according to the upgrade identifier indicating that the node template of the to-be-deployed application is used to upgrade the node template of the deployed application indicated by the identifier of the node template of the deployed application, that the deployment package is the upgrade package for the deployed application.

For example, the application deployment server checks the deployment description file appA.tosca of the application deployment package A, and finds that the description file appA.tosca includes an upgrade identifier "PatchFor", and/or a deployment artifact type "Patch" of a source application node template appPatch (namely the node template of the to-be-deployed application). The application deployment server can identify a relationship type of Patch-For or identify that the deployment artifact type is "Patch", and therefore can determine that the application deployment package A is an upgrade package. Further, the application deployment server can further check an upgrade plan upgrade, find that a type of the upgrade plan is "http://www.example.com/UpgradePlan", determine that the plan is a plan used for an upgrade, and therefore determine that the application deployment package A is an upgrade package.

Step 406. The application deployment server upgrades a deployed application node according to the deployment package of the to-be-deployed application.

Figure 6:
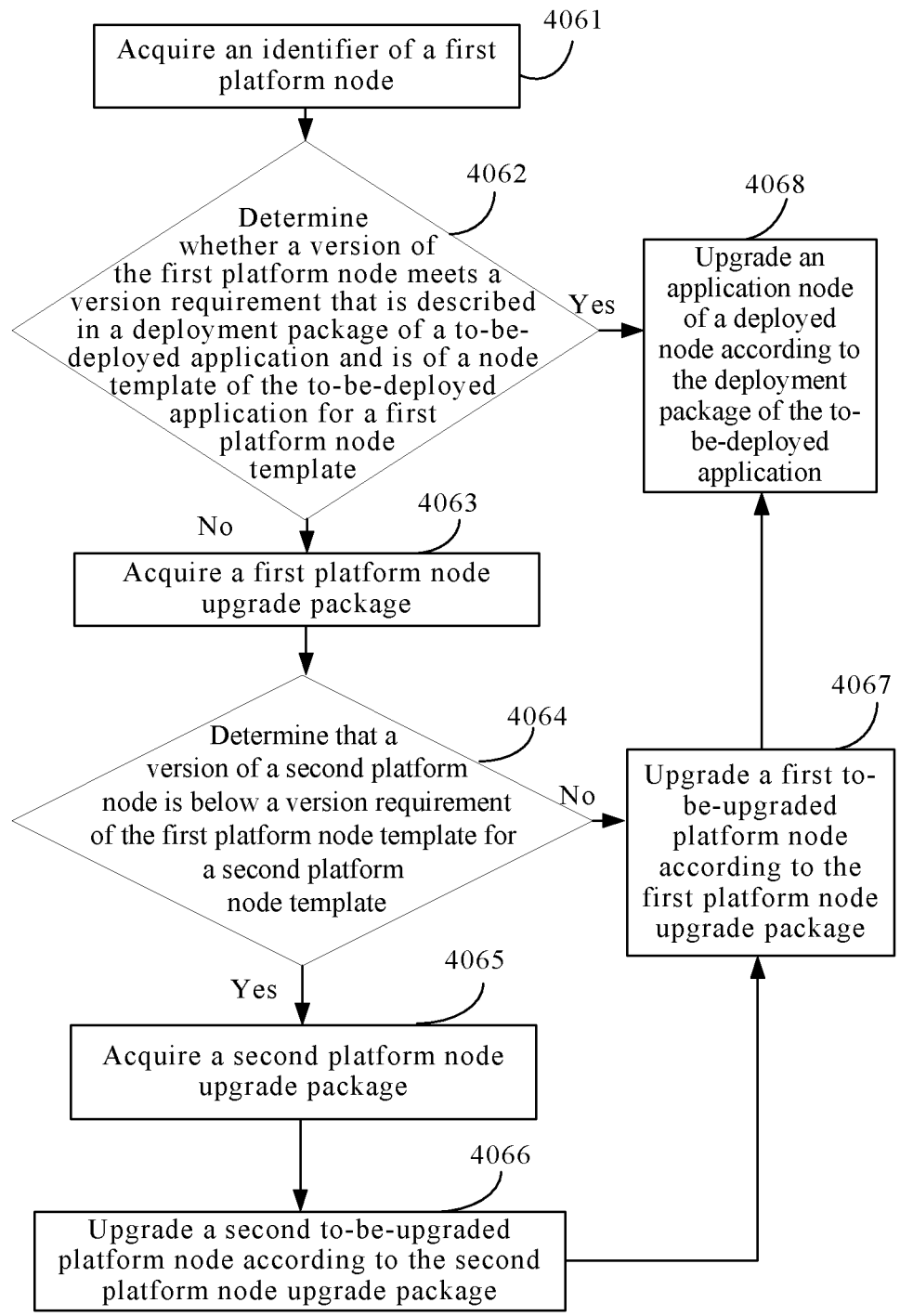
FIG. 6 is a schematic flowchart of upgrading, by an application deployment server, a deployed application node according to an embodiment of the present invention.

As shown in FIG. 6, specific steps of upgrading, by the application deployment server, the deployed application node are as follows:

Step 4061. Acquire an identifier of a first platform node. Execute step 4062.

After receiving the deployment package A of the to-be-deployed application, according to a URL that is of a description file and is included in the "Import" element in the description file of the application deployment package A, the application deployment server finds, from a deployment package information table stored by the application deployment server, a location File://ste/appB.tosca of the description file. Then, the application deployment server acquires, according to the location File://ste/appB.tosca of the description file, the description file of the application deployment package B. The deployment package information table is shown in Table 2.

TABLE 2

Deployment package information table

| Application identifier | URL of application description file | Location |
|---|---|---|
| appB | http://www.example.com/ste/appB.tosca | File://ste/appB.tosca |

Figure 7:
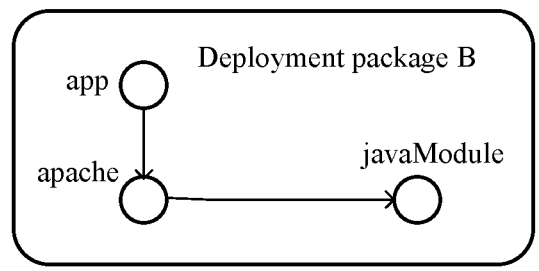
FIG. 7 is a schematic diagram of a deployment package of a to-be-deployed application according to an embodiment of the present invention.

As shown in FIG. 7, in a topology description of appB.tosca, the node template app of the deployed application, the platform node templates apache and javaModule, and relationships between these node templates are defined. The following provides a definition of main information in the topology description.

```xml
<TopologyTemplate>
  <NodeTemplate identifier="app" type="apptype" >
  <Requirement name=" requirementOfApp"
  type=" webAppContainerRequirement"/>
      //A version requirement of app is provided.
  </NodeTemplate>
   <NodeTemplate identifier="apache" type="appcontainertype">
      <Capability name="capabilityOfApache"
  type="webAppContainerCapability"/>
  //A deployment capability of apache is provided.
  <Requirement name=" requirementOfApache"
  type=" JMRequirement"/>//A version requirement of apache is provided.
      <DeploymentArtifacts>   //Deployment artifact information of apache
is provided.
        <DeploymentArtifact name="DaOfApache"
  artifactType="appContainer">
              ......//A specific description of a deployment artifact is
provided.
        </DeploymentArtifact>
      </ DeploymentArtifacts >
  </NodeTemplate>
  <NodeTemplate identifier="javaModule" type="javamoduletype">
  //A deployment capability of javaModule is provided.
      <Capability name="capabilityOfJM" type="JMCapability"/>
  </NodeTemplate>
      <RelationshipTemplate    identifier="RequirementForApache"    >
//Requirement relationship
        <SourceElement ref="requirementOfApp"/> //Version requirement of a
source app in the requirement relationship
        <TargetElement ref="capabilityOfApache"/> //Deployment capability
of a target apache in the requirement relationship
      </RelationshipTemplate>
      <RelationshipTemplate  identifier="RequirementForJM"  >  //Requirement
relationship
        <SourceElement ref="requirementOfApache"/> //Version requirement
of a source apache in the requirement relationship
        <TargetElement ref="capabilityOfJM"/> //Deployment capability of a
target javaModule in the requirement relationship
      </RelationshipTemplate>
      ......//Another definition
      <Plans>
        <Plan identifier="start" planType="http://www.example.com/StartPlan"/>
//A management plan start is defined.
            <Plan                                identifier="stop"
planType="http://www.example.com/StopPlan"/> //A management plan stop is defined.
            ......//Another management plan
      </Plans>
  </TopologyTemplate>
```

The definition of the platform node template apache describes the deployment capability capabilityOfApache. A definition of the deployment capability is included in a capability definition CapabilityDefinition element of NodeType of apache. In the platform node template apache, the description of the deployment artifact DaOfApache is also provided. The definition of the platform node template javaModule describes the deployment capability capabilityOfJM. A definition of the deployment capability is included in CapabilityDefinition of NodeType of javaModule. In the topology description, the start and stop management plans are also described. In this embodiment, a deployment capability is a version requirement for a platform node template, for example, a capability that a version provides, or a supported version.

For example, NodeType of the platform node template apache is described as follows:

```xml
<NodeType name="appcontainertype">
    <CapabilityDefinitions> //Definition of a deployment
capability of an apache node
        <CapabilityDefinition name="capabilityOfApache"
capabilityType="webAppContainerCapability">
            <Constraints>
```

*-continued*

```xml
            <Constraint constraintType=
              "http://www.example.com/
                         PropertyConstraints/supportServlet2"/>
        </Constraints>
    </CapabilityDefinition>
</CapabilityDefinitions>
</NodeType>
```

The definition of the deployment capability capabilityOfApache is provided in NodeType of apache. The constraint Constraint is provided in the definition, and the attribute value constraintType of Constraint indicates the capability of "supportServlet 2.0".

The application deployment server may first determine whether the application deployment package appA includes the identifier "app1" of the deployed application node. The identifier "app1" of the deployed application node is used to indicate an application node that needs to be upgraded. If the deployment package of the deployed application includes the identifier of the deployed application node, the application deployment server may acquire, from the database, the deployed application node indicated by the identifier of the deployed application node, and upgrade, according to the deployment package of the to-be-deployed application, the application node indicated by the identifier of the deployed application node. For example, assuming that a plan in an application deployment request describes that an identifier of a deployed application node is "app1", the application deployment server searches the deployment application information table stored by the application deployment server for the identifier app1 of the deployed application node.

If the deployment package of the to-be-deployed application does not include the identifier "app1" of the deployed application node, the application deployment server acquires, according to the identifier of the node template of the deployed application, identifiers that are of all deployed application nodes and corresponding to the identifier of the node template of the deployed application, and uses the deployment package of the to-be-deployed application to upgrade the application node indicated by the identifier of each deployed application node. Further, before upgrading each application node, the application deployment server determines the identifier of the first platform node whose version is below the version requirement of the node template of the to-be-deployed application for the first platform node template, and uses a first platform node upgrade package to upgrade the first platform node indicated by the identifier of the first platform node.

It should be noted that a same application can be deployed multiple times, and therefore an identifier of one application node template may correspond to identifiers of multiple application nodes. When the deployment package of the to-be-deployed application does not specify an identifier of an application node, the application deployment server determines to upgrade all application nodes corresponding to the identifier of the node template of the deployed application in the application deployment request. That the application deployment server determines an identifier of a to-be-upgraded application node according to the identifier of the node template of the deployed application is specifically: determining identifiers that are of all application nodes and corresponding to the identifier of the node template of the deployed application, as the identifier of the to-be-upgraded application node. Therefore, the identifiers of all the application nodes need to be acquired. For example, assuming that the identifier of the node template of the deployed application is app, the application deployment server may search the deployment application information table according to app for identifiers that are of all application nodes and corresponding to the application node template app, and obtain that the identifiers of the application nodes are {app1, app2}. The application deployment server upgrades each of the application nodes app1 and app2. Further, the application deployment request may further include an identifier of a deployed application (in one optional manner, the identifier of the deployed application may be the identifier of the deployment package of the deployed application, or the URL of the application description file, or a location of the application description file). That the application deployment server searches the deployment application information table according to the identifier app of the application node template for identifiers that of all application nodes and corresponding to the application node template app is specifically: the application deployment server searches the stored deployment application information table according to the identifier of the deployment package of the deployed application, or the URL of the application description file, or the location of the application description file, for the identifiers of all application nodes that are of the deployed application and corresponding to the application node template app, and obtains that the identifiers of the application nodes are {app1, app2}. Each application node is upgraded.

The deployment application information table is shown in Table 3. The deployment application information table records a mapping relationship among an identifier of a node, an identifier of a deployed application, and an identifier of a node template. A deployment number is used to indicate an application deployment. Nodes having a same deployment number are generated for an application in a same deployment. The identifier of a node includes an identifier of an application node and an identifier of a platform node.

TABLE 3

Deployment application information table

| Node identifier | Application identifier | Deployment number | Node template identifier |
| --- | --- | --- | --- |
| app1 | appB | 1 | app |
| Apache1 | appB | 1 | apache |
| JavaModule 1 | appB | 1 | javaModule |
| app2 | appB | 2 | app |
| Apache2 | appB | 2 | apache |
| JavaModule2 | appB | 2 | javaModule |

Step 4062. Determine whether a version of the first platform node meets a version requirement that is described in the deployment package of the to-be-deployed application and is of a node template of the to-be-deployed application for a first platform node template. If no, execute step 4063; if yes, execute step 4068.

First, the application deployment server acquires, from the database according to the identifier app1 and the deployment number 1 of the to-be-upgraded application node, and according to the identifier of the first platform node template, the identifier Apache1 of the first platform node that has the same deployment number 1, and acquires the version of the first platform node according to the identifier Apache1 of the first platform node. Specifically, the application deployment server searches the database according to the identifier Apache1 of the first platform node, and acquires a deployment capability of the first platform node Apache1. In this embodiment, it is assumed that a current deployment artifact of the first platform node Apache1 is Tomcat 6.0, which can support only Servlet 2.0, as shown in Table 4. Therefore, the version of the first platform node Apache1 is Tomcat 6.0.

It is assumed that the identifier of the deployed application node is app1. The identifier Apache1 of the first platform node that has the same deployment number as app1 is acquired from Table 3 according to the identifier of the first platform node template. From an application implementation information table stored by a CSP, it is acquired that capabilityOfApache of Apache1 can provide only a deployment capability of "supportServlet 2.0". That is, it is acquired that a version supported by the platform node indicated by the identifier Apache1 of the first platform node is Tomcat 6.0. The application implementation information table is shown in Table 4.

TABLE 4

Application implementation information table

| Application identifier | Deployment number | Platform node identifier | Deployment artifact identifier | Deployment artifact type | Deployment artifact name | Capability description |
|---|---|---|---|---|---|---|
| appB | 1 | Apache1 | DaOfApache | appContainer | Tomcat 6.0 | supportServlet2 |
| appB | 2 | Apache2 | DaOfApache | appContainer | Tomcat 7.0 | supportServlet3 |

Therefore, the application deployment server acquires the version of the first platform node according to the identifier of the first platform node template, and determines that the version of the first platform node cannot meet the version requirement of the node template of the to-be-deployed application for the first platform node template. For example, the application deployment server acquires first platform nodes Apache1 and Apache2 according to the identifier of the first platform node template in Table 3, and determines that the version of the first platform node Apache1 is only supportServlet2 or Tomcat 6.0, and cannot meet the version requirement, that is, supporting Servlet3.0 or Tomcat 6.0, of the node template of the to-be-deployed application for the first platform node template. Therefore, step 4063 is executed.

Assuming that the application deployment request includes the identifier of the deployed application node, for example, app2, the application deployment server further needs to determine a version of the first platform node Apache2 that has a same deployment number as app2. Specifically, that an application deployment server acquires the version of the first platform node according to the identifier of the first platform node template is: acquiring a deployment number of an application node indicated by the identifier of the application node, and acquiring, according to the identifier of the first platform node template, the identifier of the first platform node that has the same deployment number as the application node. That is, a deployment number corresponding to the acquired identifier of the first platform node is the same as a deployment number corresponding to the identifier of the application node. It is determined, according to the acquired identifier Apache2 of the first platform node, that the version of the first platform node Apache2 is Servlet3.0. Therefore, it is determined that a capability of the first platform node meets the version requirement of the node template of the to-be-deployed application for the first platform node template.

Step 4063. Acquire a first platform node upgrade package.

Specifically, according to the version requirement of the node template of the to-be-deployed application for the first platform node template, the first platform node upgrade package that meets the version requirement of the node template of the to-be-deployed application for the first platform node template is acquired. For example, the version of the first platform node is first acquired according to the identifier of the first platform node (for example, the application deployment server may acquire a version of a platform node from a deployment artifact name of the platform node), and a version that meets the version requirement of the node template of the to-be-deployed application for the first platform node template is determined; and then an upgrade package corresponding to the determined version that meets the version requirement of the node template of the to-be-deployed application for the first platform node template is acquired.

For example, the application deployment server acquires, from a deployment artifact name of Apache1 according to Table 4, that the version of Apache1 is Tomcat 6.0, while according to a deployment artifact information table (such as Table 5), a version that is later than the version of the Apache1 and can meet a requirement of a to-be-deployed application node for Apache1 is Tomcat 7.0. Then, the application deployment server acquires, from Table 5 according to the determined version Tomcat 7.0, that a location of an upgrade package that can be used to upgrade Apache1 from Tomcat 6.0 to Tomcat 7.0 is File://appcontainer/apache/update/appE, and acquires the upgrade package appE from the location.

TABLE 5

Deployment artifact information table

| Deployment artifact name | Type | Location | Capability description | Later version | Upgrade package location |
|---|---|---|---|---|---|
| Tomcat 6.0 | appContainer | File://appcontainer/apache/Tomcat 6.0 | supportServlet 2 | Tomcat 7.0 | File://appcontainer/apache/update/appE |
| Tomcat 7.0 | appContainer | File://appcontainer/apache/Tomcat 7.0 | supportServlet 3 | Tomcat 8.0 | File://appcontainer/apache/update/appF |

In one optional manner, the version requirement of the node template of the to-be-deployed application for the first platform node template may also be a version support capability, for example, supportServlet3. Details are not described again in the embodiment of the present invention.

Step 4064. Determine that a version of a second platform node is below a version requirement of the first platform node template for a second platform node template; otherwise, directly execute step 4067.

Before executing step 4064, the stored application deployment server determines, according to the description file of the deployment package of the deployed application, that the description file of the deployment package of the deployed application describes a destination node template (namely, the second platform node template) that uses the first platform node template as a source node template. Further, the application deployment server determines, according to the relationship template of the description file, the destination node template that uses the first platform node template asdestination node template the source node template in the relationship template. In the embodiment of the present invention, the destination node template that uses the first platform node template as the source node template is referred to as the second platform node.

FIG. 5 is still used as an example. An arrow indicating a direction exists between the apache node template and the javaModule node template. Then, in the relationship template, the apache node template is used as the source node template, and the javaModule is used as the destination node template. Therefore, the javaModule node template is used as the second platform node template. The application deployment server determines, according to a version requirement matching table (such as Table 6) for a source node template and a destination node template, that the first platform node Apache is to be upgraded to Tomcat 7.0. A node corresponding to the second platform node template javaModule needs to support JDK 1.6, but a current version of JavaModule is JDK1.5. Therefore, the version JDK1.5 of the second platform node is below a version requirement (JDK 1.6) of an upgraded first platform node for the second platform node.

TABLE 6

Version requirement matching table for a source
node template and a destination node template

| Application identifier | Identifier of source node template | Identifier of destination node template | Deployment artifact name of source node | Deployment artifact name of target node |
|---|---|---|---|---|
| appB | apache | javaModule | Tomcat 6.0 | JDK 1.5 |
| appB | apache | javaModule | Tomcat 7.0 | JDK 1.6 |

Step 4065. Acquire a second platform node upgrade package. Execute step 4066.

Specifically, the second platform node upgrade package is acquired according to a version requirement of the first platform node for the second platform node.

If an upgrade package D is maintained on the application deployment server, and the upgrade package can be used to upgrade a platform node corresponding to the node template javaModule to JDK1.6, then the second platform node upgrade package is the upgrade package D.

Step 4066. Upgrade the second platform node according to the second platform node upgrade package. Execute step 4067.

It should be noted that, before step 4066, the application deployment server further needs to continue to determine whether the description file of the deployment package of the deployed application describes a destination node template (namely, a third node template) that uses the second platform node template as a source node template, and repeatedly execute steps 4064 and 4065 until a version requirement of any node after an upgrade is met.

Step 4067. Upgrade the first platform node according to the first platform node upgrade package. Execute step 4068.

Step 4068. Upgrade the deployed application node according to the deployment package of the to-be-deployed application.

A platform node is managed by the application deployment server, while an application node is managed by a user equipment, and an application deployment package of a deployed application is also generated by the user equipment. Therefore, upgrading the deployed application actually refers to upgrading an application node corresponding to the deployed application. The upgrade process may be implemented according to information described in a plan (plan) in an acquired deployment package of a to-be-deployed application. The application deployment package describes a node template of the to-be-deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the node template of the deployed application. The deployment package of the to-be-deployed application can be used to upgrade an application node indicated by the identifier of the node template of the deployed application.

An upgrade package of the platform node is maintained by the application deployment server. If the platform node fails to be installed, unless the application deployment server is capable of responding to the failure in a timely manner and ensuring a final successful upgrade of the platform node, an application upgrade definitely fails, or an application node cannot run normally even if the application node is successfully upgraded. If the platform node is first upgraded and if the application node fails to be upgraded, it is likely that the user equipment introduces an error in a process of constructing an application node upgrade package. In this case, a CSP may return error information to the user equipment, where the error information includes an identifier of an application node on which an error occurs. The user equipment performs modification and then submits a new deployment package of the to-be-deployed application again. The application deployment server only needs to install the modified deployment package of the to-be-deployed application, and does not need to upgrade the platform node any more. Therefore, in the foregoing upgrade process, when a deployment package of a to-be-deployed application of a first application node, the first platform node upgrade package, the second platform node upgrade package, . . . , and an upgrade package of an nth platform node are acquired, the $n^{th}$ platform node, an $(n-1)^{th}$ platform node, . . . , the second platform node, the first platform node, and the first application node may be upgraded in sequence.

Step 407. The application deployment server returns upgrade response information to the user equipment.

Particularly, after each platform node is successfully upgraded, the platform node has a new version, and therefore the new version of the platform node needs to be written into the database.

For example, after an upgrade package appE is used to upgrade the platform node Apache1, the platform node Apache1 has a new version "supportServlet3" after being successfully upgraded, and therefore the deployment artifact name and the capability description in the application implementation information table need to be updated. An updated application implementation information table is shown in Table 7. The capability description or the deployment artifact name can demonstrate the version of the platform node.

TABLE 7

Application implementation information table

| Application identifier | Deployment number | Platform node identifier | Deployment artifact identifier | Deployment artifact type | Deployment artifact name | Capability description |
|---|---|---|---|---|---|---|
| appB | 1 | Apache1 | DaOfApache | appContainer | Tomcat 7.0 | supportServlet3 |
| appB | 2 | Apache2 | DaOfApache | appContainer | Tomcat 7.0 | supportServlet3 |

It should be noted that a sequence of executing steps of the application upgrade method provided in the embodiment of the present invention may be appropriately adjusted, and steps may also be correspondingly added or deleted according to a condition. Any variation readily figured out by a person skilled in the art within the technical scope disclosed in the present invention shall fall within the protection scope of the present invention, and details are not described herein again.

It can be known from the foregoing solution that, in the application upgrade method provided in the embodiment of the present invention, an application description file in a deployment package of a to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

Figure 8:
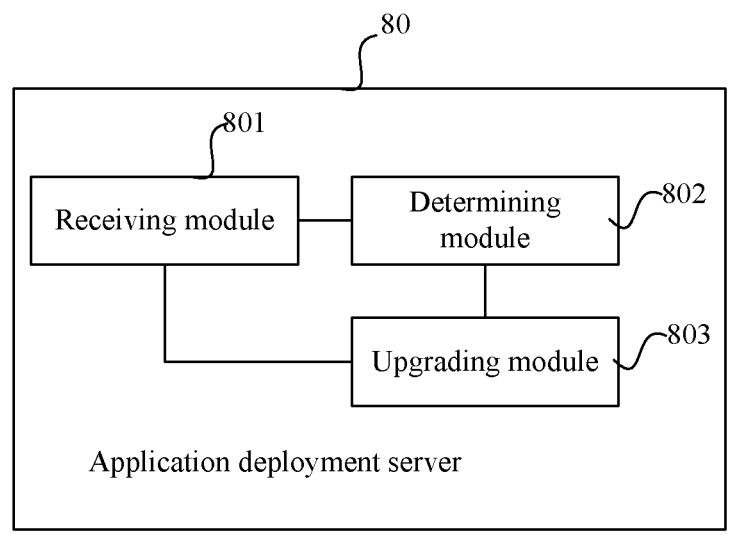
FIG. 8 is a schematic structural diagram of an application deployment server according to an embodiment of the present invention.

This embodiment of the present invention provides an application deployment server 80. As shown in FIG. 8, the application deployment server 80 includes:

a receiving module 801, configured to: receive an application deployment request, where the application deployment request includes a deployment package of a to-be-deployed application, where the deployment package of the to-be-deployed application describes a node template of the to-be-deployed application, an identifier of a deployed application, an identifier of a node template of the deployed application, an identifier of a first platform node template, a version requirement of the node template of the to-be-deployed application for the first platform node template, and an upgrade identifier indicating that the node template of the to-be-deployed application is used to upgrade the deployed application node template indicated by the identifier of the node template of the deployed application; and send the deployment package of the to-be-deployed application to a determining module 802 and an upgrading module 803;

the determining module 802, configured to: receive the application deployment package of the to-be-deployed application sent by the receiving module 801, and determine, according to the upgrade identifier, that the deployment package of the to-be-deployed application is an upgrade package of the deployed application indicated by the identifier of the deployed application; acquire, according to the identifier of the deployed application, an identifier that is of a first platform node and corresponding to the identifier of the first platform node template, and acquire a version of the first platform node indicated by the identifier of the first platform node; determine that the version of the first platform node is below the version requirement of the node template of the to-be-deployed application for the first platform node template; where it should be noted that the upgrade identifier is an upgrade identifier indicating that the node template of the to-be-deployed application is used to upgrade the node template of the deployed application indicated by the identifier of the node template of the deployed application; and acquire, according to the version requirement of the node template of the to-be-deployed application for the first platform node template, a first platform node upgrade package that meets the version requirement of the node template of the to-be-deployed application for the first platform node template, and send the first platform node upgrade package to the upgrading module; and the upgrading module 803, configured to receive the first platform node upgrade package sent by the determining module 802, and upgrade package to upgrade the first platform node indicated by the identifier of the first platform node by using the first platform node;

where the determining module 802 is further configured to determine an identifier of a to-be-upgraded application node according to the identifier of the node template of the deployed application, and send the identifier of the to-be-upgraded application node to the upgrading module 803; and the upgrading module 803 is further configured to receive the application deployment package of the to-be-deployed application sent by the receiving module 801, receive the identifier of the to-be-upgraded application node sent by the determining module 802, and upgrade the application node indicated by the identifier of the to-be-upgraded application node by using the deployment package of the to-be-deployed application.

In this way, an application description file in a deployment package of a to-be-deployed application describes a version requirement of a node template of the to-be-deployed application for a first platform node template. When a determining module determines that a version of a first platform node is below the version requirement of the node template of the to-be-deployed application for the first platform node template, an upgrading module acquires a first platform node upgrade package according to the version requirement of the node template of the to-be-deployed application for the first platform node template. After that, the upgrading module upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

It should be noted that the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

Further, the determining module 802 is specifically configured to: determine identifiers that are of all application nodes and corresponding to the identifier of the node template of the deployed application, as the identifier of the to-be-upgraded application node; or when the deployment package of the to-be-deployed application further includes an identifier that is of at least one deployed application node and corresponding to the identifier of the node template of the deployed application, the determining an identifier of a to-be-upgraded application node is specifically:

determining the identifier that is of the at least one deployed application node, corresponding to the identifier of the node template of the deployed application, and included in the application deployment package, as the identifier of the to-be-upgraded application node.

The determining module 802 is further configured to:

acquire, according to the identifier of the deployed application, a stored description file of a deployment package of the deployed application;

determine, according to the acquired description file of the deployment package of the deployed application, that the description file of the deployment package of the deployed application describes a second platform node template that uses the first platform node template as a source node template;

acquire a version requirement of an upgraded first platform node for a second platform node, and a version of the second platform node;

determine that the version of the second platform node is below the version requirement of the upgraded first platform node for the second platform node; and acquire, according to the version requirement of the upgraded first platform node for the second platform node, a second platform node upgrade package that meets the version requirement of the upgraded first platform node for the second platform node.

The upgrading module 803 is further configured to:

upgrade the second platform node according to the second platform node upgrade package.

It should be noted that the application deployment server provided in the embodiment of the present invention can execute any step executed by the application deployment server described in FIG. 2 to FIG. 6. Details are not described again in the embodiment of the present invention.

By using the application deployment server provided in the present invention, an application description file in a deployment package of a to-be-deployed application describes a version requirement of a node template of the to-be-deployed application for a first platform node template. When a determining module determines that a version of a first platform node is below the version requirement of the node template of the to-be-deployed application for the first platform node template, an upgrading module acquires a first platform node upgrade package according to the version requirement of the node template of the to-be-deployed application for the first platform node template.

After that, the upgrading module upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

Figure 9:
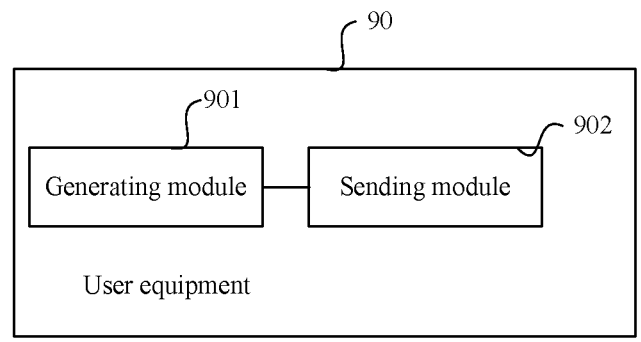
FIG. 9 is a schematic structural diagram of a user equipment according to an embodiment of the present invention.

This embodiment of the present invention provides a user equipment 90. As shown in FIG. 9, the user equipment 90 includes:

a generating module 901, configured to generate a deployment package of a to-be-deployed application, where the deployment package of the to-be-deployed application describes a node template of the to-be-deployed application, an identifier of a deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the deployed application node template indicated by the identifier of the node template of the deployed application, where the generating module 901 is further configured to generate an application deployment request, and send the application deployment request to a sending module 902, where the application deployment request includes the deployment package of the to-be-deployed application; and the sending module 902, configured to receive the application deployment request sent by the generating module 901, and send the application deployment request to an application deployment server.

In this way, a generating module of a user equipment generates a deployment package of a to-be-deployed application. An application description file in the deployment package of the to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

It should be noted that the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

The deployment package of the to-be-deployed application generated by the generating module 901 further includes an identifier that is of at least one deployed application node and corresponding to the identifier of the node template of the deployed application.

Figure 10:
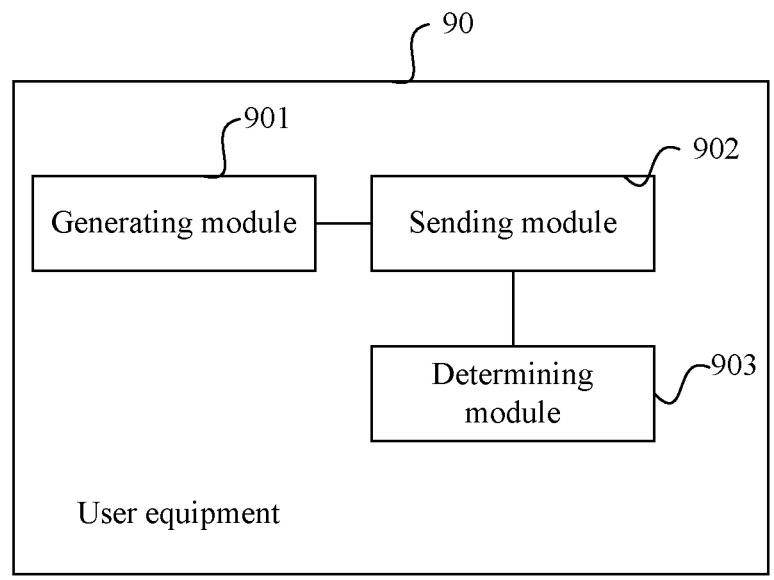
FIG. 10 is a schematic structural diagram of another user equipment according to an embodiment of the present invention.

Further, the user equipment further includes, as shown in FIG. 10, a determining module 903, configured to determine, according to a description file of a deployment package of the deployed application, the first platform node template of the deployed application indicated by the identifier of the deployed application, where the first platform node template uses the node template of the deployed application as a source node template.

It should be noted that the user equipment provided in the embodiment of the present invention can execute any step executed by the user equipment described in FIG. 2 to FIG. 6. Details are not described again in the embodiment of the present invention.

In the user equipment provided in the embodiment of the present invention, a generating module of the user equipment generates a deployment package of a to-be-deployed application. An application description file in the deployment package of the to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

Figure 11:
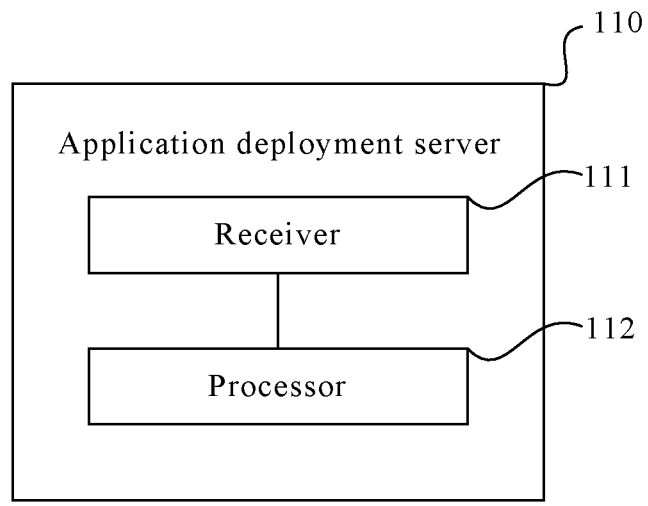
FIG. 11 is a schematic structural diagram of another application deployment server according to an embodiment of the present invention.

An embodiment of the present invention provides an application deployment server 110. As shown in FIG. 11, the application deployment server 110 includes:

a receiver 111, configured to receive an application deployment request, where the application deployment request includes a deployment package of a to-be-deployed application, where the deployment package of the to-be-deployed application describes a node template of the to-be-deployed application, an identifier of a deployed application, an identifier of a node template of the deployed application, an identifier of a first platform node template, a version requirement of the node template of the to-be-deployed application for the first platform node template, and an upgrade identifier indicating that the node template of the to-be-deployed application is used to upgrade the deployed application node template indicated by the identifier of the node template of the deployed application; and send the deployment package of the to-be-deployed application to a processor 112; and the processor 112, configured to:
receive the deployment package of the to-be-deployed application sent by the receiver 111, and determine, according to the upgrade identifier, that the deployment package of the to-be-deployed application is an upgrade package for the deployed application indicated by the identifier of the deployed application, where it should be noted that the upgrade identifier is an upgrade identifier indicating that the node template of the to-be-deployed application is used to upgrade the node template of the deployed application indicated by the identifier of the node template of the deployed application;

acquire, according to the identifier of the deployed application, an identifier that is of a first platform node and corresponding to the identifier of the first platform node template, and acquire a version of the first platform node indicated by the identifier of the first platform node;

determine, according to the version of the first platform node, that the version of the first platform node is below the version requirement of the node template of the to-be-deployed application for the first platform node template;

acquire, according to the version requirement of the node template of the to-be-deployed application for the first platform node template, a first platform node upgrade package that meets the version requirement of the node template of the to-be-deployed application for the first platform node template;

upgrade the first platform node indicated by the identifier of the first platform node template by using the first platform node upgrade package;

determine an identifier of a to-be-upgraded application node; and upgrade the application node indicated by the identifier of the to-be-upgraded application node by using the deployment package of the to-be-deployed application.

In this way, an application description file in a deployment package of a to-be-deployed application describes a version requirement of a node template of the to-be-deployed application for a first platform node template. When a processor determines that a version of a first platform node is below the version requirement of the node template of the to-be-deployed application for the first platform node template, the processor acquires a first platform node upgrade package according to the version requirement of the node template of the to-be-deployed application for the first platform node template. After that, the processor upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

It should be noted that the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

Further, the processor 112 is specifically configured to determine identifiers that are of all application nodes and corresponding to the identifier of the node template of the deployed application, as the identifier of the to-be-upgraded application node; or when the deployment package of the to-be-deployed application further includes an identifier that is of at least one deployed application node and corresponding to the identifier of the node template of the deployed application, the determining an identifier of a to-be-upgraded application node is specifically:

determining the identifier that is of the at least one deployed application node, corresponding to the identifier of the node template of the deployed application, and included in the application deployment package, as the identifier of the to-be-upgraded application node.

The processor 112 is further configured to:

acquire, according to the identifier of the deployed application, a stored description file of a deployment package of the deployed application;

determine, according to the acquired description file of the deployment package of the deployed application, that the description file of the deployment package of the deployed application describes a second platform node template that uses the first platform node template as a source node template;

acquire a version requirement of an upgraded first platform node for a second platform node, and a version of the second platform node;

determine that the version of the second platform node is below the version requirement of the upgraded first platform node for the second platform node;

acquire, according to the version requirement of the upgraded first platform node for the second platform node, a second platform node upgrade package that meets the version requirement of the upgraded first platform node for the second platform node; and upgrade the second platform node according to the second platform node upgrade package.

It should be noted that the application deployment server provided in the embodiment of the present invention can execute any step executed by the application deployment server described in FIG. 2 to FIG. 6. Details are not described again in the embodiment of the present invention.

By using the application deployment server provided in the present invention, an application description file in a deployment package of a to-be-deployed application describes a version requirement of a node template of the to-be-deployed application for a first platform node template. When a processor determines that a version of a first platform node is below the version requirement of the node template of the to-be-deployed application for the first platform node template, the processor acquires a first platform node upgrade package according to the version requirement of the node template of the to-be-deployed application for the first platform node template. After that, the processor upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

Figure 12:
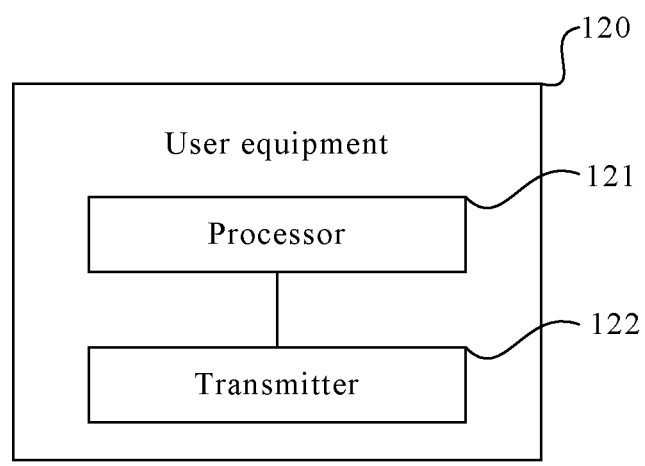
FIG. 12 is a schematic structural diagram of still another user equipment according to an embodiment of the present invention.

An embodiment of the present invention provides a user equipment 120. As shown in FIG. 12, the user equipment 120 includes:

a processor 121, configured to: generate a deployment package of a to-be-deployed application, where the deployment package of the to-be-deployed application describes a node template of the to-be-deployed application, an identifier of a deployed application, an identifier of a first platform node template, an identifier of a node template of the deployed application, a version requirement of the node template of the to-be-deployed application for the first platform node template, and an upgrade identifier indicating that the node template of the to-be-deployed application is used to upgrade the deployed application node template indicated by the identifier of the node template of the deployed application;

generate an application deployment request, where the application deployment request includes the deployment package of the to-be-deployed application; and send the application deployment request to a transmitter 122; and the transmitter 122, configured to receive the application deployment request sent by the processor, and send the application deployment request to an application deployment server.

In this way, a processor of a user equipment generates a deployment package of a to-be-deployed application, generates an application deployment request according to the deployment package of the to-be-deployed application, and sends the application deployment request to a transmitter. Then, the transmitter sends the application deployment request to an application deployment server. The application deployment server automatically upgrades a platform node and an application node according to the deployment package of the to-be-deployed application in the application deployment request. Therefore, an automation degree of an application upgrade is raised, and manual intervention is reduced.

It should be noted that the deployment package of the to-be-deployed application further includes a relationship template that describes the node template of the to-be-deployed application, and the upgrade identifier is carried in the relationship template; or the deployment package of the to-be-deployed application further includes a node type implementation corresponding to the node template of the to-be-deployed application, and the upgrade identifier is carried in the node type implementation.

Further, the deployment package of the to-be-deployed application generated by the processor 121 further includes an identifier that is of at least one deployed application node and corresponding to the identifier of the node template of the deployed application.

The processor 121 is further configured to: determine, according to a description file of a deployment package of the deployed application, the first platform node template of the deployed application indicated by the identifier of the deployed application, where the first platform node template uses the node template of the deployed application as a source node template.

It should be noted that the user equipment provided in the embodiment of the present invention can execute any step executed by the user equipment described in FIG. 2 to FIG. 6. Details are not described again in the embodiment of the present invention.

It can be known from the foregoing solution that a processor generates a deployment package of a to-be-deployed application according to an upgrade requirement of an application developer, where an application description file in the deployment package of the to-be-deployed application describes a version requirement of a node template of the to-be-deployed application for a first platform node template. When an application deployment server determines that a version of a first platform node is below the version requirement of the node template of the to-be-deployed application for the first platform node template, the application deployment server acquires a first platform node upgrade package according to the version requirement of the node template of the to-be-deployed application for the first platform node template. After that, the application deployment server upgrades the first platform node according to the acquired first platform node upgrade package. In this way, a version of an upgraded first platform node meets the version requirement of the node template of the to-be-deployed application for the first platform node template, thereby ensuring that an upgraded application can run normally.

The term "and/or" in the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for upgrading a deployed application, comprising:
    receiving, by an application deployment server, an application upgrading request from a sender with the application upgrading request comprising a node template of a to-be-upgraded application, a deployed application identifier of the deployed application to be upgraded by the to-be-upgraded application, a node template identifier of a node template of the deployed application, a first platform node template identifier of a first platform node template, and a version requirement of the first platform node template required by the node template of the to-be-upgraded application;
    acquiring, by the application deployment server according to the deployed application identifier, a first platform node identifier of a first platform node corresponding to the first platform node template identifier;
    acquiring, by the application deployment server, a version of the first platform node indicated by the first platform node identifier, wherein the to-be-upgraded application depends on a capability provided by the first platform node, and wherein the first platform node is deployed according to the first platform node template;
    determining, by the application deployment server, that the version of the first platform node is below the version requirement of the first platform node template;
    acquiring, by the application deployment server, a first platform node upgrade package that meets the version requirement, wherein the first platform node upgrade package is acquired according to the version requirement of the first platform node template required by the node template of the to-be-upgraded application;
    upgrading, by the application deployment server, the first platform node indicated by the first platform node identifier using the first platform node upgrade package;
    determining, by the application deployment server, an identifier of a to-be-upgraded application node; and
    upgrading, by the application deployment server, an application node after the first platform node is upgraded, wherein the application node is indicated by the identifier of the to-be-upgraded application node.

2. The method according to claim 1, wherein the first platform node upgrade package is maintained by the application deployment server.

3. The method according to claim 1, with the application upgrading request further comprising a relationship template describing the node template of the to-be-upgraded application and including an upgrade identifier, or with the application upgrading request further comprising a node type implementation corresponding to the node template of the to-be-upgraded application and including the upgrade identifier.

4. The method according to claim 1, wherein the determining the identifier of the to-be-upgraded application node comprises determining one or all identifiers of one or all application nodes corresponding to the node template identifier of the deployed application.

5. The method according to claim 1, wherein the determining the identifier of the to-be-upgraded application node comprises:
    when the application upgrading request does not comprise an identifier of an application node, the application deployment server determines all application node identifiers, corresponding to the node template identifier of the deployed application, as the identifier of the to-be-upgraded application node; or
    when the application upgrading request further comprises at least one deployed application node identifier, the determining the identifier of the to-be-upgraded application node comprises:
    determining the at least one deployed application node identifier as the identifier of the to-be-upgraded application node.

6. The method according to claim 1, wherein the application node is upgraded according to an application deployment description file comprised in the application upgrading request.

7. A non-transitory computer-readable media storing computer instructions for upgrading an application, that when executed by one or more processors, cause the one or more processors to perform the steps of:

receiving an application upgrading request, with the application upgrading request comprising a node template of a to-be-upgraded application, a deployed application identifier of a deployed application to be upgraded by the to-be-upgraded application, a node template identifier of a node template of the deployed application, a first platform node template identifier of a first platform node template, and a version requirement of the first platform node template required by the node template of the to-be-upgraded application;

acquiring, according to the deployed application identifier, a first platform node identifier of a first platform node corresponding to the first platform node template identifier;

acquiring a version of the first platform node indicated by the first platform node identifier, wherein the to-be-upgraded application depends on a capability provided by the first platform node, and wherein the first platform node is deployed according to the first platform node template;

determining that the version of the first platform node is below the version requirement of the first platform node template;

acquiring a first platform node upgrade package that meets the version requirement, wherein the first platform node upgrade package is acquired according to the version requirement of the first platform node template required by the node template of the to-be-upgraded application;

upgrading the first platform node indicated by the first platform node identifier using the first platform node upgrade package;

determining an identifier of a to-be-upgraded application node; and upgrading an application node after the first platform node is upgraded, wherein the application node is indicated by the identifier of the to-be-upgraded application node.

8. The computer-readable storage medium of claim 7, wherein the first platform node upgrade package is maintained locally.

9. The computer-readable storage medium of claim 7, the application upgrading request further comprising a relationship template describing the node template of the to-be-upgraded application and including an upgrade identifier.

10. The computer-readable storage medium of claim 7, the application upgrading request further comprising a node type implementation corresponding to the node template of the to-be-upgraded application and including the upgrade identifier.

11. The computer-readable storage medium of claim 7, wherein the determining the identifier of the to-be-upgraded application node comprises determining one or all identifiers of one or all application nodes corresponding to the node template identifier of the deployed application.

12. The computer-readable storage medium of claim 7, wherein the determining the identifier of the to-be-upgraded application node comprises:

when the application upgrading request does not comprise an identifier of an application node, the application deployment server determines all application node identifiers, corresponding to the node template identifier of the deployed application, as the identifier of the to-be-upgraded application node; or when the application upgrading request further comprises at least one deployed application node identifier, the determining the identifier of the to-be-upgraded application node comprises:

determining the at least one deployed application node identifier as the identifier of the to-be-upgraded application node.

13. The computer-readable storage medium of claim 7, wherein before the upgrading of the first platform node indicated by the first platform node identifier, further comprises instructions for:

acquiring, according to the deployed application identifier, a stored description file of the deployed application;

determining, according to the acquired description file, that the description file describes a second platform node template that uses the first platform node template as a source node template;

acquiring a version requirement of a second platform node required by the upgraded first platform node for a second platform node and acquire a second platform node version of the second platform node; and determining that the second platform node version is below the version requirement of the second platform node required by the upgraded first platform node; and before the upgrading of the first platform node using the first platform node upgrade package, further comprising:

acquiring, in response to the determination that the version of the second platform node is below the version requirement of the second platform node required by the upgraded first platform node, a second platform node upgrade package that meets the version requirement; and upgrading the second platform node according to the second platform node upgrade package.

14. The computer-readable storage medium of claim 7, wherein the application node is upgraded according to an application deployment description file comprised in the application upgrading request.

15. An application deployment server, comprising:
a memory storing instructions; and
one or more processors coupled to the memory, with the one or more processors executing the computer instructions to perform the steps of:

receiving an application upgrading request, the application upgrading request comprising a node template of a to-be-upgraded application, a deployed application identifier of a deployed application to be upgraded by the to-be-upgraded application, a node template identifier of a node template of the deployed application, a first platform node template identifier of a first platform node template, and a version requirement of the first platform node template required by the node template of the to-be-upgraded application;

acquiring, according to the deployed application identifier, a first platform node identifier of a first platform node corresponding to the first platform node template identifier and acquiring a version of the first platform node indicated by the first platform node identifier, wherein the to-be-upgraded application depends on a capability provided by the first platform node, and wherein the first platform node is deployed according to the first platform node template;

determining that the version of the first platform node is below the version requirement of the first platform node template;

acquiring a first platform node upgrade package that meets the version requirement, wherein the first platform node upgrade package is acquired according to the version requirement of the first platform node template required by the node template of the to-be-upgraded application;

upgrading the first platform node indicated by the first platform node identifier using the first platform node upgrade package;

determining an identifier of a to-be-upgraded application node; and upgrading an application node after the first platform node is upgraded, wherein the application node is indicated by the identifier of the to-be-upgraded application node.

16. The application deployment server of claim 15, wherein the first platform node upgrade package is maintained by the application deployment server.

17. The application deployment server of claim 15, the application upgrading request further comprising a relationship template describing the node template of the to-be-upgraded application and including an upgrade identifier.

18. The application deployment server of claim 15, the application upgrading request further comprising a node type implementation corresponding to the node template of the to-be-upgraded application and including the upgrade identifier.

19. The application deployment server of claim 15, wherein the determining the identifier of the to-be-upgraded application node comprises determining one or all identifiers of one or all application nodes corresponding to the node template identifier of the deployed application.

20. The application deployment server of claim 15, wherein the application node is upgraded according to an application deployment description file comprised in the application upgrading request.

* * * * *

UNITED STATES PATENT AND TRADEMARK OFFICE
CERTIFICATE OF CORRECTION

PATENT NO. : 10,649,761 B2  
APPLICATION NO. : 16/220962  
DATED : May 12, 2020  
INVENTOR(S) : Zhu et al.

Page 1 of 2

It is certified that error appears in the above-identified patent and that said Letters Patent is hereby corrected as shown below:

On the Title Page

Item (71), Column 1, "Applicant", Line 2: replace "CO.,LTD." with --CO., LTD.--

In the Specification

Column 1, Line 23: replace "cloud computing is to managing" with --cloud computing is managing--

Column 17, Line 13: replace "apache" with --Apache™--
Column 17, Line 16: replace "apache" with --Apache™--
Column 17, Line 18: replace "apache" with --Apache™--
Column 17, Line 24: replace "apache" with --Apache™--
Column 17, Table 1, Lines 6-7: replace "apache" with --Apache™--

Column 18, Line 16: replace "apache" with --Apache™--
Column 18, Line 21: replace "apache" with --Apache™--
Column 18, Line 24: replace "apache" with --Apache™--
Column 18, Line 25: replace "Tomcat" with --Tomcat™--
Column 18, Line 25: replace "apache" with --Apache™--
Column 18, Line 31: replace "apache" with --Apache™--
Column 18, Line 33: replace "Tomcat" with --Tomcat™--

Column 19, Line 8: replace "apache" with --Apache™--
Column 19, Line 10: replace "Apache" with --Apache™--
Column 19, Line 16: replace "apache" with --Apache™--

Column 24, Line 64: replace "apache" with --Apache™--

Column 25, Line 43: replace "apache" with --Apache™--

Signed and Sealed this  
Twenty-second Day of November, 2022

Katherine Kelly Vidal  
*Director of the United States Patent and Trademark Office*

CERTIFICATE OF CORRECTION (continued)
U.S. Pat. No. 10,649,761 B2

Column 25, Line 47: replace "apache. In the platform node template apache" with --Apache™. In the platform node template apache™--
Column 25, Line 59: replace "apache" with --Apache™--

Column 26, Line 53: replace "apache" with --Apache™--

Column 28, Table 3, Lines 6, 9: replace "apache" with --Apache™-- (two occurrences)
Column 28, Line 51: replace "Tomcat" with --Tomcat™--
Column 28, Line 54: replace "Tomcat" with --Tomcat™--
Column 28, Line 66: replace "Tomcat" with --Tomcat™--

Column 29, Table 4, Lines 6-7: replace "Tomcat" with --Tomcat™-- (two occurrences)
Column 29, Line 21: replace "Tomcat" with --Tomcat™--
Column 29, Line 23: replace "Tomcat" with --Tomcat™--
Column 29, Table 5, Lines 5-6: replace "Tomcat" with --Tomcat™-- (four occurrences)

Column 30, Line 23: replace "Tomcat" with --Tomcat™--
Column 30, Line 28: replace "Tomcat" with --Tomcat™--
Column 30, Line 30: replace "Tomcat" with --Tomcat™--
Column 30, Line 32: replace "Tomcat 6.0 to Tomcat 7.0" with --Tomcat™ 6.0 to Tomcat™ 7.0--
Column 30, Line 65: replace "asdestination" with --as destination--

Column 31, Line 4: replace "apache" with --Apache™--
Column 31, Line 6: replace "apache" with --Apache™--
Column 31, Line 13: replace "Tomcat" with --Tomcat™--
Column 31, Line 13: replace "apache" with --Apache™--
Column 31, Table 6, Lines 8-9: replace "Tomcat" with --Tomcat™-- (two occurrences)
Column 31, Table 6, Lines 8-9: replace "apache" with --Apache™--

Column 33, Table 7, Lines 6-7: replace "Tomcat" with --Tomcat™-- (two occurrences)